US008086025B2

(12) United States Patent  
Ramstad

(10) Patent No.: US 8,086,025 B2
(45) Date of Patent: Dec. 27, 2011

(54) UNIVERSAL STEREOSCOPIC FILE FORMAT

(76) Inventor: Monte Jerome Ramstad, Cannon Falls, MN (US)

( * ) Notice: Subject to any disclaimer, the term of this patent is extended or adjusted under 35 U.S.C. 154(b) by 881 days.

(21) Appl. No.: 12/152,041

(22) Filed: May 12, 2008

(65) Prior Publication Data

US 2008/0279449 A1   Nov. 13, 2008

Related U.S. Application Data

(60) Provisional application No. 60/928,520, filed on May 10, 2007, provisional application No. 60/932,354, filed on May 31, 2007, provisional application No. 60/994,001, filed on Sep. 17, 2007, provisional application No. 60/997,931, filed on Oct. 9, 2007, provisional application No. 61/005,920, filed on Dec. 10, 2007.

(51) Int. Cl.
G06K 9/00    (2006.01)

(52) U.S. Cl. ........... 382/154; 382/162; 382/167; 353/7; 353/31; 358/500; 358/501

(58) Field of Classification Search .............. 382/154, 382/162, 166, 167, 284; 353/7, 31, 102; 358/500, 501, 510
See application file for complete search history.

(56) References Cited

U.S. PATENT DOCUMENTS

| | | | |
|---|---|---|---|
| 1,422,527 A | 7/1922 | Berger | |
| 2,135,197 A | 11/1938 | Norling | |
| 2,136,303 A | 11/1938 | Lumiere | |
| 2,568,327 A | 9/1951 | Dudley | |
| 2,623,433 A | 12/1952 | Stipek | |
| 3,240,138 A | 3/1966 | Goddard | |
| 3,256,776 A | 6/1966 | Land et al. | |
| 3,507,549 A | 4/1970 | Land | |
| 3,776,725 A | 12/1973 | McCann et al. | |
| 3,820,874 A | 6/1974 | Scarpetti | |
| 4,009,951 A | 3/1977 | Ihms | |
| 4,134,644 A | 1/1979 | Marks et al. | |
| 4,264,926 A | 4/1981 | Etra | |
| 4,620,770 A | 11/1986 | Wexler | |
| 4,734,756 A | 3/1988 | Butterfield et al. | |
| 4,905,081 A | 2/1990 | Morton | |
| 5,398,131 A | 3/1995 | Hall et al. | |
| 5,491,646 A | 2/1996 | Erskine | |
| 5,661,518 A | 8/1997 | Palm et al. | |
| 6,037,971 A | 3/2000 | McLaine et al. | |
| 6,335,755 B1 | 1/2002 | McLaine et al. | |
| 6,389,236 B1 | 5/2002 | Western | |
| 6,624,842 B2 | 9/2003 | McLaine et al. | |
| 6,631,205 B1 | 10/2003 | Melen et al. | |
| 6,678,323 B2 | 1/2004 | Tam et al. | |
| 6,687,003 B1 | 2/2004 | Sorensen et al. | |
| 6,748,105 B1 | 6/2004 | Mancuso et al. | |
| 6,956,964 B2 | 10/2005 | Lee et al. | |
| 7,001,021 B2 | 2/2006 | Jorke | |
| 7,130,488 B2 | 10/2006 | Harrington et al. | |
| 7,215,792 B2 | 5/2007 | Sharma et al. | |
| 7,379,588 B2 | 5/2008 | Loce | |
| 2004/0246389 A1* | 12/2004 | Roth | 349/5 |
| 2008/0267527 A1* | 10/2008 | Berretty | 382/276 |

OTHER PUBLICATIONS

Woo et al: "Stereo imaging using a camera with stereoscopic adapter", SMC-IEEE, intl. conf. 2000.*
Wu et al: "Directional interpolation for field-sequential stereoscopic video", ISCAS-IEEE, intl. conf. 2005.*
Saravanan et al: "Color image to grayscale image convertion", ICCEA-IEEE, 2010.*

* cited by examiner

Primary Examiner — Samir Ahmed
Assistant Examiner — Ruiping Li

(57) ABSTRACT

Stereoscopic images may be represented in four coordinates where a first image is represented in three coordinates and a second image is represented of one coordinate. The brightness contrast is the property largely used in stereoscopic perception. The brightness and color of the first image is represented in three coordinates while the brightness of the second image is represented in the one coordinate. Color perception is dominated by the first image. A universal file format with four channels allows the stereoscopic images to be displayed as anaglyphs or as two full color images or as non-stereoscopic images. The anaglyphs may be rendered in three primary colors or four primary colors providing wide compatibility with traditional and specialized display apparatus. The universal file format facilitates methods to capture, display, convert, and communicate stereoscopic images.

51 Claims, No Drawings

UNIVERSAL STEREOSCOPIC FILE FORMAT

CROSS-REFERENCE TO RELATED APPLICATIONS

This application claims the benefit of Provisional Application Ser. Nos. 60/928,520 filed of date May 10, 2007, 60/932,354 filed of date May 31, 2007, 60/994,001 filed of date Sep. 17, 2007, U.S. 60/997,931 filed of date Oct. 9, 2007, and 61/005,920 filed of date Dec. 10, 2007 all of which are incorporated herein in its entirety by reference thereto.

REFERENCE TO SEQUENCE LISTING, A TABLE, OR A COMPUTER PROGRAM LISTING COMPACT DISC APPENDIX

Not Applicable

BACKGROUND

Stereoscopic content may be distributed by broadcast television, stored on DVD's or other storage media, downloaded through the internet, transmitted by video phone, or distributed by other methods. In distributing stereoscopic content, it is desirable that the format of the stereoscopic content be compatible with many stereoscopic and non-stereoscopic display apparatus. It is also desirable that the amount of additional storage space or bandwidth required for stereoscopic content over non-stereoscopic content be minimal.

Stereoscopic images generally consist of two images which are related by a small change in the lateral perspective. When viewed through an enabling apparatus, stereoscopic images may provide the perception of stereoscopic depth. Stereoscopic content may be distributed as left and right image pairs or as anaglyph images. Stereoscopic content may also be distributed as a single image (stream) combined with a depth map (stream). The depth map may be used to generate a plurality of stereoscopic image pairs. Stereoscopic content may be compressed before distribution by methods similar to compressing non-stereoscopic content.

Anaglyphs are stereoscopic images wherein different sets of primary colors are used to render the first and second images of the stereo pair. Usually, the spectra of the first and second images do not overlap significantly. Then the first and second images may be viewed selectively using two complementary color viewing filters. The first viewing filter $F_1$ may be used to view the first image while the second viewing filter $F_2$ may be used to view the second image. The first filter substantially transmits the primary colors of the first image and blocks the primary colors of the second image. The second filter substantially transmits the primary colors of the second image and blocks the primary colors of the first image.

Anaglyphs are often rendered in three primary colors where the first image is rendered in two primary colors while the second image is rendered in one primary color. In red/cyan anaglyphs, the first image is rendered in green and blue primary colors while the second image is rendered in a red primary color. Other types of anaglyphs may include blue/yellow and green/magenta anaglyphs. Herein these anaglyphs are called three-color anaglyphs.

Distributing stereoscopic content as full-color left and right pairs may require substantial extra bandwidth or compression and de-compression processing that may inhibit the inclusion of stereoscope content in some of the distribution methods used for stereoscopic content. Distributing stereoscopic content in the anaglyph format using three primary color channels may require little extra bandwidth over non-stereoscopic content, however the anaglyph format is not sufficiently compatible with non-stereoscopic full-color display methods due to the lack of full-color information in the anaglyph format.

Some standard video formats such as the MPEG-C (Motion Picture Experts Group) format provide for an extra channel to accompany the video information. This extra channel may be used by methods in the prior art to provide a depth map video. The depth map video may be used to generate a plurality of stereoscopic views of the video content. These plurality of views may be used in autostereoscopic and other stereoscopic display methods to display stereoscopic images. Distributing stereoscopic content as a single image stream with a depth map stream allows stereoscopic information to be provided in a single channel and may be compatible with non-stereoscopic display methods. However a depth map generally does not provide for generating occluded data which occurs in one image of a stereoscopic pair of images, but not the other. The methods of including occluded data in addition to the depth map may reduce the compression ratio of the format and may require all stereoscopic displays to provide complex de-compression and image construction processing capabilities. Therefore, there is a need for alternate distribution methods which are highly compressible and compatible with many stereoscopic and non-stereoscopic display methods.

BRIEF SUMMARY OF THE INVENTION

The present invention is directed to the use of digital files, primary colors, color transformations, and special filters to store, distribute, display and view stereoscopic images in various formats without retinal rivalry.

The present invention concerns methods to store and distribute stereoscopic content in a universal file format that may be compatible with both stereoscopic display methods and non-stereoscopic display methods which may include full-color stereoscopic display methods and anaglyph stereoscopic display methods. The present invention also concerns methods to capture and display stereoscopic content distributed in the universal file format.

In one embodiment of the present invention, a digital stereoscopic image may be stored in four color channels in a digital file wherein the color information of the first image may be stored in three color coordinates $\{C_1, C_2, C_3\}$ and the brightness $Y_{B2}$ of the second image may be stored in a fourth coordinate $\{Y_L\}$. The color coordinates $\{C_1, C_2, C_3\}$ may be of various color spaces wherein the brightness $Y_{1B}$ of the first image may be determined approximately from the color information in the coordinates $\{C_1, C_2, C_3\}$. The four-channel format of the present embodiment may be summarized as $\{C_1, C_2, C_3, Y_L\}$. If a first image of a stereoscopic pair of images is represented by coordinates $\{A_1, \ldots, A_r\}$, the first image may be transformed into the coordinates $\{C_1, C_2, C_3\}$ using a transformation $G_C$. If a second image of a stereoscopic pair of images is represented by coordinates $\{B_1, \ldots, B_S\}$, the second image may be transformed into the coordinates $\{Y_L\}$ using a transformation $G_Y$.

For example, if the first image may be represented by red $R_1$, green $G_1$, and blue $B_1$ color coordinates of the sRGB color space and the second image may be represented by red $R_2$, green $G_2$, and blue $B_2$ color coordinates of the sRGB color space, the stereoscopic image may be stored in four channels as follows: $\{R_1, G_1, B_1, Y_{B2}\}$ wherein the brightness of the second image may be determined approximately by the brightness function $$Y_{B2} = (\alpha_1 R_2^\gamma + \alpha_2 G_2^\gamma + \alpha_3 B_2^\gamma)^{1/\gamma}$$

where $\alpha_1$ is about 0.2126, $\alpha_2$ is about 0.7152, and $\alpha_3$ is about 0.0722 and $\gamma$ is about 2.2. The brightness of the first image may be determined approximately by the brightness function $$Y_{B1}=(\alpha_1 R_1^\gamma+\alpha_2 G_1^\gamma+\alpha_3 B_1^\gamma)^{1/\gamma}.$$

In another example, if the first image may be represented in coordinates $\{x_1,y_1,Y_1\}$ of the CIE xyY color space and the second image may be represented in coordinates $\{x_2,y_2,Y_2\}$ of the CIE xyY color space, then the stereoscopic image may be stored in four channels as follows: $\{x_1,y_1,Y_1,Y_2\}$ where the brightness of the first image may be determined approximately by $Y_{B1}=Y_1$ and the brightness of the second image may be determined approximately by $Y_{B2}=Y_2$.

The four channel stereoscopic format of the present invention is also be applicable to stereoscopic video. One embodiment of the present invention provides a method to store a first video in three color video channels $\{C_1,C_2,C_3\}$ and to store a brightness coordinate $Y_{B2}$ of a second video in a fourth video channel $\{Y_L\}$. The color coordinates $\{C_1,C_2,C_3\}$ may be of various color spaces. Then the stereoscopic video format of the present invention may be represented as $\{C_1,C_2,C_3,Y_L\}$. Herein the aspects of the present invention which are applicable to the image format $\{C_1,C_2,C_3,Y_L\}$ are also applicable to the video format $\{C_1,C_2,C_3,Y_L\}$ and vise versa unless otherwise stated or is obvious from the context. The stereoscopic format $\{C_1,C_2,C_3,Y_L\}$ may be independent of the properties of a display apparatus for displaying stereoscopic or non-stereoscopic images.

Some embodiments of the present invention provide methods of displaying stereoscopic images stored in the format $\{C_1,C_2,C_3,Y_L\}$ in various display formats such as two full color image formats, anaglyph formats and non-stereoscopic formats. A display apparatus of the present invention may comprise transformations $G_1$ and $G_2$ which transformation the color coordinates $\{C_1,C_2,C_3,Y_L\}$ into the primary colors of the display apparatus. If a display apparatus has primary colors $\{P_1,\ldots,P_m\}$ for displaying the first image and primary colors $\{Q_1,\ldots,Q_n\}$ for displaying the second image, the transformation $G_1$ may transform or render the color and brightness contrast of the first image into the primary colors $\{P_1,\ldots,P_m\}$ and the transformation $G_2$ may transform or render the color and/or brightness contrast of the second image into the primary colors $\{Q_1,\ldots,Q_n\}$. The transformations $G_1$ and $G_2$ may be selected in order that the observed brightness contrast of the first and second images are balanced for like subject matter and the observed color is representative of the colors of the subject of the stereoscopic image. The transformations $G_1$ and $G_2$ may compensate for the affects of the viewing apparatus (such as color viewing filters) on the observed color and brightness contrast of the first and second images.

In some embodiments of the present invention, a display apparatus providing three primary colors $\{P_1,P_2,Q_1\}$ may display stereoscopic images stored in the $\{C_1,C_2,C_3,Y_L\}$ format as conventional three-color anaglyphs. The transformation $G_1$ may transform the coordinates $\{C_1,C_2,C_3\}$ into the primary colors $\{P_1,P_2\}$. The transformation $G_2$ may transform the coordinate $\{Y_L\}$ into the primary color $\{Q_1\}$.

In some embodiments of the present invention, a display apparatus providing four primary colors $\{P_1,P_2,P_3,Q_1\}$ may display stereoscopic images stored in the format $\{C_1,C_2,C_3,Y_L\}$ as four-color anaglyphs. The transformation $G_1$ may transform the coordinates $\{C_1,C_2,C_3\}$ into the primary colors $\{P_1,P_2,P_3\}$. The transformation $G_2$ may transform the coordinate $\{Y_L\}$ into the primary color $\{Q_1\}$.

In some embodiments of the present invention, a display apparatus providing five or six primary colors $\{P_1,P_2,P_3,Q_1,\ldots,Q_n\}$ may display stereoscopic images stored in the format $\{C_1,C_2,C_3,Y_L\}$ as five or six-primary-color stereoscopic images. The transformation $G_1$ may transform the coordinates $\{C_1,C_2,C_3\}$ into the primary colors $\{P_1,P_2,P_3\}$. The transformation $G_2$ may transform the coordinate $\{Y_L\}$ into the primary colors $\{Q_1,\ldots,Q_n\}$. In the case of five or six primary colors, the format $\{C_1,C_2,C_3,Y_L\}$ may be extended by methods of the present invention to comprise depth information and occluded image data in order to facilitate generating two color images by the display apparatus from the format $\{C_1,C_2,C_3,Y_L\}$.

Some embodiments of the present invention provides methods to display two full color stereoscopic image pairs from stereoscopic images stored in the format $\{C_1,C_2,C_3,Y_L\}$ and extensions of this format. The second full color image may be obtained from the color of the first image and a fitting method which finds like subject matter in the first and second images. The fitting method may match the variation of the brightness of the first and second images with the possible help of sparse depth map data. The two colored images may be displayed in full color by conventional methods such as polarized images or autostereoscopic methods or side-by-side formats. The four-channel stereoscopic format of the present invention may be compatible with stereoscopic display methods which require two full-color images represented in coordinates $\{C_1,C_2,C_3\}$ of the first image and coordinates $\{D_1,D_2,D_3\}$ of the second image. The second full-color image coordinates $\{D_1,D_2,D_3\}$ may be generated from the coordinates $(C_1,C_2,C_3,Y_L)$ using methods of the prior art or using methods of the present invention.

The four-channel stereoscopic format of the present invention $\{C_1,C_2,C_3,Y_L\}$ may be compatible with non-stereoscopic display methods. A non-stereoscopic display may display the first image using the coordinates $\{C_1,C_2,C_3\}$ and discard the coordinates $\{Y_L\}$.

There are several methods of distributing or communicating stereoscopic content which are embodiments of the present invention. These embodiments may comprise the follow components: (1) methods to capture stereoscopic content; (2) methods to transform the stereoscopic content into the coordinates $\{C_1,C_2,C_3,Y_L\}$; (3) methods to compress the coordinates $\{C_1,C_2,C_3,Y_L\}$; (4) methods to store stereoscopic content; (5) methods to transmit or broadcast the content in the coordinates $\{C_1,C_2,C_3,Y_L\}$; (6) methods to receive the coordinates $\{C_1,C_2,C_3,Y_L\}$; (7) methods to de-compress the coordinates $\{C_1,C_2,C_3,Y_L\}$; and (8) methods to display the stereoscopic images.

DETAILED DESCRIPTION OF THE INVENTION

Additional information can be found in United States patent application serial number 2008/000835 by inventor Monte J. Ramstad which is incorporated in its entirety by reference hereto.

Additional information can be found in United States patent application serial number 2008/000841 by inventor Monte J. Ramstad which is incorporated in its entirety by reference hereto.

Additional information can be found in United States patent application serial number 2008/000855 by inventor Monte J. Ramstad which is incorporated in its entirety by reference hereto.

Additional information can be found in a co-pending United States patent application titled *Display of Generalized Anaglyphs Without Retinal Rivalry* by inventor Monte J. Ramstad which is incorporated in its entirety by reference hereto.

The Stereoscopic Brightness Coordinate

The present invention identifies the color property which may be substantially used by the visual system to process stereoscopic information. Herein this stereoscopic color property is called brightness contrast or brightness. The brightness may be considered a carrier of the brightness contrast in the image. When the brightness contrast is balanced in both eyes for like subject matter, retinal rivalry may be essentially absent from the stereo view and full stereoscopic depth (true-depth) may be perceived in a stereo view. Some embodiments of the present invention provide methods to store the stereoscopic information of a stereoscopic image in a single brightness coordinate $Y_B$.

In stereoscopic images, retinal rivalry may be associated with unbalanced brightness contrast in the first and second images of the stereo view. For example in red/cyan anaglyphs, a red object, which may appear relatively bright through a red filter and may appear relatively dark through a cyan filter, may cause retinal rivalry in a stereo view. Usually the human visual system may not easily fuse a dark object observed by one eye with a bright object observed by the other eye. Instead, the user essentially experiences double vision, where the left and right eyes "see" independently, and stereoscopic perception may be much reduced or absent. (Stereoscopic perception requires the cooperation of both eyes.) The presence of retinal rivalry or unbalanced brightness contrast may be associated with less than full stereoscopic depth perception in a stereoscopic image.

In general, retinal rivalry may be observed in stereoscopic images where an edge in the subject matter is observed with more brightness contrast in one eye than in the other eye. This suggests that balancing the brightness contrast in all subject matter may eliminate retinal rivalry. Furthermore, stereoscopic fusion depends largely on the edges of objects being observed by both eyes. Herein an edge may be generalized to any type of brightness contrast in an image. In order for all edges to be equally detected by both eyes for all subject matter, it is apparently sufficient to observe balanced brightness contrast at all brightness levels in the image. Herein the definition of balanced brightness contrast in the first and second images is: the relative brightness contrast in the two views which minimizes retinal rivalry in the stereo view at substantially all brightness levels. By balancing the brightness contrast in all subject matter observed by the left and right eyes in a stereo view, full-depth perception may be perceived in the stereo view.

The brightness of a color is generally an integral of the brightness contrast. Therefore, the present invention provides a definition of brightness. Determining a condition of balanced brightness may require comparing the brightness of various colors. The relative brightness of different colors may depend on subjective evaluation by users. The relative brightness of different colors may vary from user to user and may vary over time for the same user. The relative brightness of different color hues may also depend on the size of a patch of a color hue, the surrounding color hues, and on the vision adaptation of the user.

In the prior art, the term brightness is generally used to describe an observed property of light rather than a physical property of light. In the present invention, brightness also describes an observed property of light. However, in the present invention, brightness is defined by the minimization of retinal rivalry in a stereo view rather than the property of a single image.

The brightness color property $Y_B$ of the present invention is similar to the luminance coordinate Y in the CIE xyY color spaces however, the defining measurements are different. Some of the differences in the measurements of the brightness $Y_B$ of the present invention and luminance Y of the CIE color models may include: (1) the brightness $Y_B$ may be determined while viewing through colored filter glasses whereas the luminance Y is determined using unfiltered vision; (2) the number of primary colors contributing to the brightness $Y_B$ and the luminance Y may be different; (3) the color patch size is not necessarily fixed when determining $Y_B$ whereas a standard patch size is usually used to determine the luminance Y; (4) the brightness $Y_B$ is defined by the observed retinal rivalry being minimized for all edges (or levels of contrast) whereas the luminance Y is defined by judging the "brightness" of a single image; (5) the spectra of primary colors contributing to the brightness $Y_B$ and the luminance Y may be different especially when brightness $Y_B$ takes into account the effects of the viewing filters on the primary colors; (6) the white point of the color space may be shifted in the measurement of the brightness $Y_B$ due to the limited spectra of the viewing filters, (7) the brightness $Y_B$ may include factors such as chromatic brightness and vision adaptation. Herein, chromatic brightness may include the enhanced brightness observed in highly saturated colors, in colors that include a narrow range of wavelengths of light, and in colors of various patch size.

Although the brightness $Y_B$ and luminance Y properties are defined differently, in practice, they may describe similar properties of light. Therefore in some embodiments of the present invention, the brightness $Y_B$ and the luminance Y may be used interchangeably. The present invention may utilize any method of calculating the brightness $Y_B$ which may include methods which follow by analogy from methods of calculating the luminance Y which may be described in the prior art or developed in the future. Herein the brightness coordinate $Y_B$ may also be called the luminance coordinate without loss of generality.

Four-Channel Stereoscopic File Format

One embodiment of the present invention provides methods to store digital stereoscopic image pairs in four color channels $\{C_1, C_2, C_3, Y_L\}$ of a digital file where the color information of the first image may be stored in three color channels $\{C_1, C_2, C_3\}$ and the brightness $Y_{B2}$ of the second image may be stored in the fourth channel $\{Y_L\}$. If a first image has color coordinates $\{A_1, \ldots A_r\}$ and the second image has color coordinates $\{B_1, \ldots, B_s\}$, the first image may be transformed into the three color channels $\{C_1, C_2, C_3\}$ using a transformation $G_C$, and the second image may be transformed into the brightness channel $\{Y_L\}$ using a transformation $G_Y$ as follows:

$$(A_1, \ldots A_r) \xrightarrow{G_C} \{C_1, C_2, C_3\}$$

$$\{B_1, \ldots, B_s\} \xrightarrow{G_Y} \{Y_L\}.$$

The first and second images represented in coordinates $\{A_1, \ldots A_r\}$ and coordinates $\{B_1, \ldots, B_s\}$ respectively may ideally have balanced brightness for like subject matter which is the typical condition in which stereoscopic images are captured for example with two identical cameras. The transformation $G_C$ may preserve the brightness contrast of the first image in the coordinates $\{C_1, C_2, C_3\}$. The transformation $G_Y$ may preserve the brightness contrast of the second image in the coordinate $\{Y_L\}$ (using any method of calculating brightness coordinate $Y_{B2}$). Then the coordinates $\{C_1, C_2, C_3\}$ and $\{Y_L\}$ may represent balanced brightness contrast for like subject matter in the stereoscopic image.

The transformation $G_C$ which transforms the brightness contrast of the first image represented in the coordinates $\{A_1, \ldots A_r\}$ into the color coordinates $\{C_1, C_2, C_3\}$ may be obtained as follows:

First, the coordinates $\{A_1, \ldots A_r\}$ may be transformed into linear brightness coordinates $(A^L_1, \ldots A^L_r)$:

$$A^L_j = H_{Aj}(A_j)$$

using functions $H_{Aj}$. The functions $H^{-1}_{Aj}$ are the non-linearity functions encoded into the coordinates $\{A_1, \ldots A_r\}$ of the first image. Linear brightness coordinates may be defined as color coordinates whose contribution to the brightness of a color may be added together to obtain the total brightness of a color.

In some reference color spaces, the form of the functions $H_{Aj}$ may be known. For example in the sRGB color space, the functions $H_{Aj}$ may be approximated by:

$$H_{Aj}(A_j) = A_j^{\gamma j}$$

where $\gamma_j$ may be about 2.2. Then the linear brightness $Y^L_A$ of the first image may be obtained by adding the contribution of each coordinate to the brightness:

$$Y^L_A = \Sigma_j \mu_j A^L_j = \Sigma_j \mu_j H_{Aj}(A_j)$$

where $$1 = \Sigma_j \mu_j.$$

The parameters $\mu_j$ may be determined from observations. In a reference color space, the values of $\mu_j$ may be known. For example in the sRGB color space, $\mu_1$ may be about 0.2126, $\mu_2$ may be about 0.7152, and $\mu_3$ may be about 0.0722.

Second, a transformation W may be selected to transform the coordinates $A^L_j$ into the linear coordinates given by $C^L_k = H_{Ck}(C_k)$ as follows $$C^L_k = \Sigma_j W_{kj} A^L_j.$$

Preferably, the elements $W_{kj}$ may be selected to represent the color (hue and saturation) of the coordinates $\{A_1, \ldots A_r\}$ in the coordinates $\{C_1, C_2, C_3\}$ however, this is not required in order to display a balanced brightness stereoscopic image. The transformation W may be a linear transformation or a complex, non-linear function.

The linear brightness of the first image represented in the coordinates $\{C_1, C_2, C_3\}$ may be approximated by $$Y^L_C = \Sigma_k \nu_k C^L_k = \Sigma_k \nu_k H_{Ck}(C_k)$$

where $$1 = \Sigma_k \nu_k.$$

The parameters $\nu_j$ may be determined from observations. In a reference color space, the values of $\nu_j$ may be known. For example in the sRGB color space, $\nu_1$ may be about 0.2126, $\nu_2$ may be about 0.7152, and $\nu_3$ may be about 0.0722.

In order to conserve the brightness in the first image, the elements $W_{kj}$ may satisfy the condition $$\mu_j = \lambda_3 \Sigma_k \nu_k W_{kj}$$

where $\lambda_3$ is a scaling factor. These conditions may be satisfied by selecting elements $W_{kj}$ which conserve the brightness of each initial color coordinate $A_j$.

Third, the linear coordinates $C^L_k$ may be transformed into the non-linear values $$C_k = H^{-1}_{Ck}(C^L_k)$$

where the functions $H^{-1}_{Ck}$ may be determined by the color space of the coordinates $\{C_1, C_2, C_3\}$. A color space may use a gamma function to approximate $H_{Ck}$ as follows:

$$C_k = (C^L_k)^{1/\gamma k}$$

where the $\gamma_k$ are properties of the color space.

The transformation $G_C$ may be represented by the relationship $$C_k = H^{-1}_{Ck}(\Sigma_j W_{kj} H_{Aj}(A_j))$$

or sometimes by the relationship $$C_k = (\Sigma_j W_{kj} A_j^{\gamma j})^{1/\gamma k}.$$

where $\gamma$ and $\gamma_k$ are often near 2.2.

The transformation $G_Y$ which transforms the brightness contrast of the second image represented in the coordinates $(B_1, \ldots B_s)$ into the color coordinates $\{Y_L\}$ may be obtained as follows:

First, the coordinates $\{B_1, \ldots B_s\}$ may be transformed into linear brightness coordinates $(B^L_1, \ldots B^L_s)$:

$$B^L_j = H_{Bj}(B_j)$$

using functions $H_{Bj}$. The functions $H^{-1}_{Bj}$ are the non-linearity functions encoded into the coordinates $\{B_1, \ldots B_s\}$ of the second image. Linear brightness coordinates may be defined as color coordinates whose contribution to the brightness of a color may be added together to obtain the total brightness of a color.

In some reference color spaces, the form of the functions $H_{Bj}$ may be known. For example in the sRGB color space, the functions $H_{Bj}$ may be approximated by:

$$H_{Bj}(B_j) = B_j^{\gamma j}$$

where $\gamma_j$ may be about 2.2. Then the linear brightness $Y^L_B$ of the second image may be obtained by adding the contribution of each coordinate to the brightness:

$$Y^L_B = \Sigma_j \sigma_j B^L_j = \Sigma_j \sigma_j H_{Bj}(B_j)$$

where $$1 = \Sigma_j \sigma_j.$$

The parameters $\sigma_j$ may be determined from observations. In a reference color space, the values of $\sigma_j$ may be known. For example in the sRGB color space, $\sigma_1$ may be about 0.2126, $\sigma_2$ may be about 0.7152, and $\sigma_3$ may be about 0.0722.

Second, a transformation W may be selected to transform the coordinates $B^L_j$ into the linear coordinates given by $Y^L_Y = H_Y(Y_L)$ as follows $$Y^L_Y = \Sigma_j \sigma_j B^L_j.$$

In order to conserve the brightness in the second image, the linear brightness $Y^L_Y$ of the second image represented in the coordinates $\{Y_L\}$ may be set equal to the linear brightness $Y^L_B$ $$Y^L_Y = Y^L_B = \Sigma_j \sigma_j B^L_j = \Sigma_j \sigma_j H_{Bj}(B_j).$$

Third, the linear coordinates $Y^L_L$ may be transformed into the non-linear values $$Y_L = H^{-1}_Y(Y^L_Y) = H^{-1}_Y(\Sigma_j \sigma_j H_{Bj}(B_j))$$

where the functions $H^{-1}_Y$ may be determined by the color space of the coordinates $\{Y_L\}$. A color space may use a gamma function to approximate $H_Y$ as follows:

$$Y_L = (Y^L_L)^{1/\gamma}$$

where the $\gamma$ is a property of the color space.

The transformation $G_Y$ may be represented by the relationship $$Y_L = H^{-1}_Y(\Sigma_j \sigma_j H_{Bj}(B_j))$$

or sometimes by the relationship $$Y_L = (\Sigma_j \sigma_j B_j^{\gamma j})^{1/\gamma}.$$

where $\gamma$ and $\gamma_j$ are often near 2.2.

In general, the stereoscopic brightness coordinates $\{Y_C\}$ and $\{Y_L\}$ of the present invention may depend on the properties of the display and viewing apparatus. However, for the purpose of distributing stereoscopic images, it may be advantageous for the coordinates $\{C_1,C_2,C_3,Y_L\}$ to be independent of the display and viewing apparatus. Then a display apparatus may process the coordinates $\{C_1,C_2,C_3,Y_L\}$ to render stereoscopic images with balanced brightness for the particular method of displaying and viewing the stereoscopic images.

One embodiment of the present invention provides methods to store stereoscopic images in coordinates $\{C_1,C_2,C_3\}$ and $\{Y_L\}$ which do not depend on the viewing filters or the display primary colors. In this embodiment, coordinates $\{C_1,C_2,C_3\}$ and $\{Y_L\}$ may be determined with respect to a standard reference color space which contains a set of reference primary colors of a standard display apparatus, and with respect to perfectly transmissive viewing filters (such as pure air).

Various reference color spaces may be used to store the first and second images with balanced brightness in the format $\{C_1,C_2,C_3,Y_L\}$ of the present invention. For example, if the first image may be represented by red $R_1$, green $G_1$, and blue $B_1$ color coordinates of the sRGB color space and the second image may be represented by red $R_2$, green $G_2$, and blue $B_2$ color coordinates of the sRGB color space, the stereoscopic image may be stored in four channels as follows: $\{R_1,G_1,B_1,Y_{B2}\}$ wherein the brightness of the second image may be determined approximately by the brightness function $$Y_{B2}=(\alpha_1 R_2^\gamma+\alpha_2 G_2^\gamma+\alpha_3 B_2^\gamma)^{1/\gamma}$$

where $\alpha_1$ is about 0.2126, $\alpha_2$ is about 0.7152, and $\alpha_3$ is about 0.0722 and $\gamma$ is about 2.2. The brightness of the first image may be determined approximately by the brightness function $$Y_{B1}=(\alpha_1 R_1^\gamma+\alpha_2 G_1^\gamma+\alpha_3 B_1^\gamma)^{1/\gamma}.$$

In practice, the brightness $Y_{B1}$ may not need to be calculated. The brightness $Y_{B1}$ is shown here in order to support the claim that the brightness of the first and second images may be balanced $Y_{B1}{\sim}Y_{B2}$ for like subject matter.

In another example, if the first image may be represented in coordinates $\{x_1,y_1,Y_1\}$ of the CIE xyY color space and the second image may be represented in coordinates $\{x_2,y_2,Y_2\}$ of the CIE xyY color space. Then the stereoscopic image may be stored in four channels as follows: $\{x_1,y_1,Y_1,Y_2\}$ where the brightness of the first image may be represented approximately by $Y_{B1}=Y_1$ and the brightness of the second image may be represented approximately by $Y_{B2}=Y_2$.

Displaying Stereoscope Images

A display apparatus receiving stereoscopic image in the coordinates $\{C_1,C_2,C_3,Y_L\}$ may transform the coordinates into the primary colors of the display apparatus using transformations $G_1$ and $G_2$ which may take into account the properties of the primary colors of the display apparatus and viewing apparatus. For a display apparatus with primary colors $\{P_1, \ldots, P_m\}$ for displaying the first image and primary colors $\{Q_1, \ldots, Q_n\}$ for displaying the second image, the transformation $G_1$ may transform the coordinates $\{C_1,C_2,C_3\}$ into the primary colors $\{P_1, \ldots, P_m\}$ $$\{C_1, C_2, C_3\} \xrightarrow{G_1} \{P_1, \ldots, P_m\}.$$

and the transformation $G_2$ may transform the coordinates $\{Y_L\}$ into the primary colors $\{Q_1, \ldots, Q_n\}$ $$\{Y_{B2}\} \xrightarrow{G_2} \{Q_1, \ldots, Q_n\}.$$

The transformation $G_1$ may be selected so that the brightness $Y_P$ observed in the primary colors $\{P_1, \ldots, P_m\}$ may be balanced with the brightness $Y_C$ represented in the coordinates $\{C_1,C_2,C_3\}$. For example, if the brightness $Y_P$ may be approximated by $$Y_P=(\beta_1 P_1^\gamma+\beta_2 P_2^\gamma+\beta_3 P_3^\gamma)^{1/\gamma},$$

and the brightness $Y_C$ may be approximated by $$Y_C=(\alpha_1 C_1^\gamma+\alpha_2 C_3^\gamma+\alpha_3 C_3^\gamma)^{1/\gamma},$$

the transformation $G_1$ may be selected so that the brightness contrast represented in coordinates $Y_P$ is balanced with the brightness contrast represented in the coordinate $Y_C$, $Y_P{\sim}Y_C$.

Similarly, the transformation $G_2$ may be selected so that the brightness $Y_Q$ observed in the primary colors $\{Q_1, \ldots, Q_n\}$ may be balanced with the brightness $Y_Y$ represented in the coordinates $\{Y_L\}$. For example, if the brightness $Y_Q$ may be approximated by $$Y_Q=(\delta_1 Q_1^\gamma+\delta_2 Q_2^\gamma+\delta_3 Q_3^\gamma)^{1/\gamma},$$

and the brightness $Y_Y$ may be approximated by $Y_Y=H_Y(Y_L)$. The transformation $G_2$ may be adjusted so that the brightness contrast represented in coordinates $\{Y_Q\}$ is balanced with the brightness contrast represented in the coordinates $\{Y_Y\}$, $Y_Q{\sim}Y_Y$.

Some embodiments of the present provide methods to generate the color coordinates $\{D_1,D_2,D_3\}$ of the second image from the coordinates $\{C_1,C_2,C_3,Y_L\}$. Then the transformation $G_2$ may transform the coordinates $\{D_1,D_2,D_3\}$ into the primary colors $\{Q_1, \ldots, Q_n\}$ $$\{D_1, D_2, D_3\} \xrightarrow{G_2} \{Q_1, \ldots, Q_n\}.$$

The brightness $Y_D$ represented in the coordinates $\{D_1,D_2,D_3\}$ may be approximated by $$Y_D=(\alpha_1 D_1^\gamma+\alpha_2 D_2^\gamma+\alpha_3 D_3^\gamma)^{1/\gamma}.$$

The transformation $G_2$ may be selected so that the brightness contrast represented in coordinates $\{D_1,D_2,D_3\}$ is balanced with the brightness contrast represented in the coordinates $\{Q_1, \ldots, Q_n\}$, $Y_Q{\sim}Y_D$.

Alternatively, the transformations $G_1$ and $G_2$ may be selected so that the displayed stereoscopic image satisfies the balanced brightness condition $Y_P{\sim}Y_Q$ which is a less restrictive condition on the transformations than accurately representing the brightness represented in the coordinates $\{C_1,C_2,C_3,Y_L\}$.

While the coordinates $\{Y_L\}$ contain the brightness information of the second image, the coordinates $\{C_1,C_2,C_3\}$ may contain the brightness information of the first image either directly such as when using CIE xyY coordinates, or indirectly such as when using sRGB coordinates. The coordinates $\{C_1,C_2,C_3\}$ may also contain the chromaticity information of the first image either directly such as when using CIE xyY coordinates or indirectly such as when using sRGB coordinates.

One aspect of the present invention provides methods to identify that the stereoscopic format $\{C_1,C_2,C_3,Y_L\}$ of the present invention is contained in the file by using metadata. The metadata may identify the properties of the color space or primary colors used to determine the values of the coordinates $\{C_1,C_2,C_3,Y_L\}$.

Methods to Display the Second Image in One Primary Color

One embodiment of the present invention is a method of displaying stereoscopic images comprising a display apparatus providing primary colors $\{P_1, \ldots, P_m\}$ for displaying a first image and a providing primary color $\{Q_1\}$ for displaying a second image. The first image may be represented in color coordinates $\{C_1,C_2,C_3\}$. The second image may be represented in color coordinates $\{Y_L\}$. The display apparatus may comprise a transformation $G_1$ which transforms the coordinates $\{C_1,C_2,C_3\}$ into the primary colors $\{P_1, \ldots, P_m\}$ and a transformation $G_2$ which transforms the coordinates $\{Y_L\}$ into the primary color $\{Q_1\}$ whereby the brightness displayed in the first and second images may be balanced for like subject matter in the first and second images. The coordinates $\{C_1, C_2, C_3, Y_L\}$ may be coordinates of any color space from which the brightness of the first and second images may be obtained. This embodiment may provide methods to display three-color anaglyphs and four-color anaglyphs.

The transformations $G_1$ and $G_2$ may be summarized as follows:

$$\{C_1, C_2, C_3\} \xrightarrow{G_1} \{P_1, \ldots, P_m\}$$

$$\{Y_L\} \xrightarrow{G_2} \{Q_1\}.$$

Herein, the first and second images represented in coordinates $\{C_1,C_2,C_3\}$ and coordinates $\{Y_L\}$ respectively may have balanced brightness for like subject matter. The coordinates $\{C_1, C_2, C_3\}$ and coordinates $\{Y_L\}$ may be of any color space from which the brightness may be obtained. The transformation $G_1$ may preserve the brightness contrast of the first image in the primary colors $\{P_1, \ldots P_m\}$. The transformation $G_2$ may preserve the brightness contrast of the second image in the primary colors $\{Q_1\}$. Then the primary colors $\{P_1, \ldots P_m\}$ and $\{Q_1, \ldots Q_n\}$ may display balanced brightness contrast for like subject matter in the first and second images.

For example if the brightness of the coordinates $\{C_1,C_2,C_3\}$ is represented by a function $$Y_C = Y_C(C_1,C_2,C_3),$$

and the brightness of the primary colors $\{P_1, \ldots, P_m\}$ is represented by a function $$Y_P = Y_P(P_1, \ldots, P_m),$$

then the transformation $G_1$ may be selected in order to balance the brightness contrast in the coordinates $\{C_1,C_2,C_3\}$ and in the primary colors $\{P_1, \ldots, P_m\}$: $Y_P \sim Y_C$.

Similarly, if the brightness of the coordinates $\{Y_L\}$ is represented by a function $$Y_Y = Y_Y(Y_L),$$

and the brightness of the primary color $\{Q_1\}$ is represented by a function $$Y_Q = Y_Q(Q_1),$$

then the transformation $G_2$ may be selected in order to balance the brightness contrast in the coordinates $\{Y_L\}$ and in the primary color $\{Q_1\}$: $Y_Q \sim Y_Y$.

Since stereoscopic images stored in the format $\{C_1,C_2,C_3, Y_L\}$ may be created to satisfy the condition $Y_C \sim Y_Y$, the additional conditions of $Y_Q \sim Y_Y$ and $Y_P \sim Y_C$ may provide for balance brightness in the display primary colors, $Y_Q \sim Y_P$. Thus, stereoscopic images distributed in the coordinates $\{C_1,C_2,C_3, Y_L\}$ may be displayed with balanced brightness in the first and second images. In general, the relative brightness of the primary colors $\{P_1, \ldots, P_m\}$ and $\{Q_1\}$ may be adjusted in order to compensate for the transmission spectra of specific viewing filters.

Herein the values of the primary colors $\{P_1, \ldots, P_m\}$ and $\{Q_1\}$ may be considered the color coordinate values of a display apparatus. The display apparatus may transform the coordinate values into the physical primary colors $\{P_1, \ldots, P_m\}$ and $\{Q_1\}$. Herein the notation does not always distinguish between the color coordinates of the display apparatus and the physical primary colors of a display apparatus although the distinction will be clear from the context to one skilled in the art.

The transformation $G_1$ which transforms the brightness contrast of the first image represented in the coordinates $\{C_1,C_2,C_3\}$ into the values of the primary colors $\{P_1, \ldots, P_m\}$ may be obtained as follows:

First, the coordinates $\{C_1,C_2,C_3\}$ may be transformed into linear brightness coordinates $\{C^L_1, C^L_2, C^L_3\}$:

$$C^L_j = H_{Cj}(C_j)$$

using functions $H_{Cj}$. The functions $H^{-1}{}_{Cj}$ are the non-linearity functions encoded into the coordinates $\{C_1,C_2,C_3\}$ of the first image. Linear brightness coordinates may be defined as color coordinates whose contribution to the brightness of a color may be added together to obtain the total brightness of a color.

In some reference color spaces, the form of the functions $H_{Cj}$ may be known. For example in the sRGB color space, the functions $H_{Cj}$ may be approximated by:

$$H_{Cj}(C_j) = C_j^{\gamma j}$$

where $\gamma_j$ may be about 2.2. Then the linear brightness $Y^L_C$ of the first image may be obtained by adding the contribution of each coordinate to the brightness:

$$Y^L_C = \Sigma_j \alpha_j C^L_j = \Sigma_j \alpha_j H_{Cj}(C_j)$$

where $$1 = \Sigma_j \alpha_j.$$

The parameters $\alpha_j$ may be determined from observations. In a reference color space, the values of $\alpha_j$ may be known. For example in the sRGB color space, $\alpha_1$ may be about 0.2126, $\alpha_2$ may be about 0.7152, and $\alpha_3$ may be about 0.0722.

Second, a transformation M may be selected to transform the coordinates $C^L_j$ into the linear primary color values $P^L_k = H_P(P_k)$ of the display apparatus as follows $$P^L_k = \Sigma_j M_{kj} C^L_j = \Sigma_j M_{kj} H_{Cj}(C_j).$$

Preferably, the elements $M_{kj}$ may be selected to represent the chromaticity of the coordinates $\{C_1,C_2,C_3\}$ in the primary colors $\{P_1, \ldots, P_m\}$ however, this is not required in order to display a balanced brightness stereoscopic image. In general, the transformation M may be a linear transformation or a complex, non-linear function.

The linear brightness of the first image displayed in the primary colors $\{P_1, \ldots, P_m\}$ may be approximated by $$Y^L_P = \Sigma_k \beta_k P^k_L = \Sigma_k \beta_k H_P(P_k)$$

where $$1 = \Sigma_k \beta_k.$$

The parameters $\beta_k$ may be determined from experimental observations of the relative brightness of the primary colors of the display apparatus viewed through a first viewing filter $F_1$.

In order to conserve the brightness in the first image, the elements $M_{kj}$ may satisfy the condition $$\alpha_j = \lambda_1 \Sigma_k \beta_k M_{kj}$$

where $\lambda_1$ is a scaling factor. These conditions may be satisfied by selecting elements $M_{kj}$ which conserve the brightness of each initial color coordinate $C_j$.

Third, the linear primary colors $P^L_k$ may be transformed into the non-linear values used by the display apparatus $$P_k = H^{-1}{}_{Pk}(P^L_k)$$

where the functions $H^{-1}{}_{Pk}$ may be determined for the primary colors of a display apparatus. A display apparatus may use a gamma function to approximate $H_{Pk}$ as follows:

$$P_k = (P^L_k)^{1/\gamma_k}$$

where the $\gamma_k$ are properties of the display apparatus.

The transformation $G_1$ may be represented by the relationship $$P_k = H^{-1}{}_{Pk}(\Sigma_j M_{kj} H_{Cj}(C_j))$$

or sometimes by the relationship $$P_k = (\Sigma_j M_{kj} C_j{}^{\gamma j})^{1/\gamma_k}.$$

where $\gamma_j$ and $\gamma_k$ are often near 2.2.

Similarly, the transformation $G_2$ of the second image into the primary color $\{Q_1\}$ which conserves the brightness contrast represented in the coordinates $\{Y_L\}$ may be obtained as follows:

First, the coordinates $\{Y_L\}$ may be transformed into linear brightness coordinates $\{Y^L_L\}$:

$$Y^L_L = H^Y(Y_L)$$

using function $H_Y$. The function $H^{-1}{}_Y$ is the non-linearity function encoded into the coordinates $\{Y_L\}$ of the second image.

In some reference color spaces, the form of the function $H_Y$ may be known. For example in the sRGB color space, the functions $H_Y$ may be approximated by:

$$H_Y(Y_L) = Y_L{}^{\gamma_Y}$$

where $\gamma_Y$ may be about 2.2. Then the linear brightness $Y^L_Y$ of the second image may be represented in the coordinates $\{Y_L\}$ may be given by:

$$Y^L_Y = Y_L{}^{\gamma_Y}.$$

Second, a transformation may be selected to transform the coordinates $Y^L_L$ into the linear primary color value $Q^L_1 = H_{Qk}(Q_k)$ of the display apparatus as follows $$Q^L_1 = \alpha Y^L_L = \alpha H_Y(Y_L)$$

where $\alpha$ is a constant.

Third, the linear primary colors $Q^L_1$ may be transformed into the non-linear values used by the display apparatus $$Q_1 = H^{-1}{}_{Q1}(Q^L_1)$$

where the functions $H^{-1}{}_{Q1}$ may be determined for the primary colors of a display apparatus. A display apparatus may use a gamma function to approximate $H_{Q1}$ as follows:

$$Q_1 = (Q^L_1)^{1/\gamma_Q}$$

where the $\gamma_1$ is a property of the display apparatus.

The transformation $G_2$ may be represented by the relationship $$Q_k = \alpha_Q H^{-1}{}_{Q1}(H_Y(Y_L))$$

or sometimes by the relationship $$Q_1 = \alpha_Q Y_L{}^{\gamma}$$

where $\alpha_Q$ may be a selectable parameter, $\gamma = \gamma_Y / \gamma_Q$, and $\gamma_Y$ and $\gamma_Q$ are often near 2.2.

The filters $F_1$ and $F_2$ may be colored filters or polarized filters. In some display methods, viewing filters may not be needed and the $F_1$ and $F_2$ filters may be replaced by the viewing apparatus of the display method. If the spectra of the primary colors $\{P_1, \ldots, P_m\}$ do not substantially overlap the spectra of the primary color $\{Q_1\}$, the viewing filters may be color filters where the first viewing filter $F_1$ substantially transmits the primary colors $\{P_1, \ldots, P_m\}$ and blocks the primary colors $\{Q_1, \ldots, Q_n\}$; and the second viewing filter $F_2$ substantially transmits the primary colors $\{Q_1, \ldots, Q_n\}$ and blocks the primary colors $\{P_1, \ldots, P_m\}$.

The two transformations $G_1$ and $G_2$ may be used to transform the initial stereoscopic coordinates $\{C_1, C_2, C_3, Y_L\}$ containing any distribution of color into displayed anaglyph images with balanced brightness contrast. These methods apply to anaglyphs displayed using any number of primary colors. Examples are described below for two and three primary colors $\{P_1, \ldots, P_m\}$ and one primary color $\{Q_1\}$ corresponding to three-color and four-color anaglyphs.

Display of Four-Color Anaglyphs

This first example demonstrates a method to display stereoscopic images distributed in the coordinates $\{C_1, C_2, C_3, Y_L\}$ as a four-color anaglyph with balanced brightness contrast.

As one example of the transformation $G_1$, a first image represented by red, green, and blue color coordinates $\{R, G, B\} = \{C_1, C_2, C_3\}$ may be transformed into red, green, and blue display primary colors $\{P_1, P_2, P_3\}$. For this example, the coordinates $\{R, G, B\}$ may be coordinates of the sRGB color space. For a particular display apparatus, the linear brightness of the primary colors may be approximated by $$Y^L_P = 0.30 P^L_1 + 0.60 P^L_2 + 0.10 P^L_3.$$

The linear brightness of the first image in the coordinates $\{R, G, B\}$ of the sRGB color space may be approximated by the luminance function $$Y^L_C = 0.21 R^L_1 + 0.72 G^L_2 + 0.07 B^L_3.$$

The conditions on the transformation $M_{kj}$ may be $$0.21 = 0.30 M_{1R} + 0.60 M_{2R} + 0.10 M_{3R},$$

$$0.72 = 0.30 M_{1G} + 0.60 M_{2G} + 0.10 M_{3G}, \text{ and}$$

$$0.07 = 0.30 M_{1B} + 0.60 M_{2B} + 0.10 M_{3B}.$$

In a simple case, the off diagonal elements of $M_{kj}$ may be set to zero. Then $$0.21 = 0.30 M_{1R},$$

$$0.72 = 0.60 M_{2G}, \text{ and}$$

$$0.07 = 0.10 M_{3B}.$$

It follows that $M_{1R} = 0.7$, $M_{2G} = 1.2$, and $M_{2B} = 0.7$. Then $$P^L_1 = 0.7 R^L,$$

$$P^L_2 = 1.2 G^L, \text{ and}$$

$$P^L_3 = 0.7 B^L.$$

Since $M_{2G} = 1.2$ is greater than 1.0, the values of $P^L_2$ may exceed the capabilities of the display device. Therefore, the elements $M_{kj}$ may be divided by 1.2 to obtain $$P^L_1 = 0.58 R^L,$$

$$P^L_2 = 1.0 G^L, \text{ and}$$

$$P^L_3 = 0.58 B^L.$$

The renormalization of the elements of $M_{kj}$ is consistent with balancing the brightness contrast of the displayed images. The primary values $Q_1$ may also be reduced by a factor of 1.2, however the scale of $Q_1$ relative to the $P_j$ may be selectable.

The complete transformation $G_1$ may be written as:

$$P_1=(0.58R^{2.2})^{1/\gamma},$$

$$P_2=G^{2.2/\gamma}, \text{ and}$$

$$P_3=(0.58B^{2.2})^{1/\gamma}$$

where $\gamma$ may often be chosen to be identical for each primary color $P_j$. The value of $\gamma$ may depend on the properties of the primary colors of the display apparatus. If $\gamma=2.2$, then $$P_1=0.78R,$$

$$P_2=G, \text{ and}$$

$$P_3=0.78B.$$

In general, a transformation $G_1$ may be selected to also represent the chromaticity of the first image in the primary colors $\{P_1,P_2,P_3\}$ to the chromaticity of the first image in the coordinates $\{R,G,B\}$. In this case, the off-diagonal elements of $M_{kj}$ may not necessarily be zero and the transformation may be more complex.

For a particular display apparatus, the transformation $G_2$ may transform the coordinates $\{Y_L\}$ into the primary color $\{Q_1\}$ as follows:

$$Q_1=\alpha_Q Y_L$$

where $\alpha_Q$ may be chosen to select the relative brightness of the second image; and where $\gamma=2.2$ in the range of brightness values selected for the primary color $\{Q_1\}$.

Display of Three-Color Anaglyphs

A second example demonstrates a method to display stereoscopic images distributed in the coordinates $\{C_1,C_2,C_3,Y_L\}$ as red/cyan anaglyphs with balanced brightness contrast.

As one example of the transformation $G_1$, a first image represented by red, green, and blue color coordinates $\{R,G,B\}=\{C_1,C_2,C_3\}$ may be transformed into green, and blue display primary colors $\{P_1,P_2\}$. For this example, the coordinates $\{R,G,B\}$ may be coordinates of the sRGB color space. For a particular display apparatus, the linear brightness of the primary colors may be approximated by $$Y^L_P=0.80P^L_1+0.20P^L_2.$$

The linear brightness of the first image in the coordinates $\{R,G,B\}$ of the sRGB color space may be approximated by the luminance function $$Y^L_C=0.21R^L_1+0.72G^L_2+0.07B^L_3.$$

The balanced brightness conditions on the transformation $M_{kj}$ may be $$0.21=0.80M_{2R}+0.20M_{3R},$$

$$0.72=0.80M_{2G}+0.20M_{3G}, \text{ and}$$

$$0.07=0.80M_{2B}+0.20M_{3B}.$$

If the primary color $P_1$ is green and the primary color $P_2$ is blue, a simple case may map the green coordinate G 100% into the green primary color $P_1$, the blue coordinate B 100% into the blue primary color $P_2$, and the red coordinate R 50% into each of the green and blue primary colors $P_1$ and $P_2$. In other words, $M_{3G}=M_{2B}=0$ and $M_{2R}=M_{3R}$. Then $$0.21=0.80M_{2R}+0.20M_{3R},$$

$$0.72=0.80M_{2G}, \text{ and}$$

$$0.07=0.20M_{3B}.$$

It follows that $M_{2R}=M_{3R}=0.21$, $M_{2G}=0.9$, and $M_{2B}=0.35$. Then $$P^L_1=0.9G^L+0.21R^L \text{ and}$$

$$P^L_2=0.35B^L+0.21R^L.$$

Since $M_{2G}+M_{2R}=1.11$, is greater than 1.0, the values of $P^L_1$ may exceed the capabilities of the display apparatus. Therefore, the $M_{kj}$ may be divided by 1.11 to obtain $$P^L_1=0.81G^L+0.19R^L \text{ and}$$

$$P^L_2=0.32B^L+0.19R_L.$$

The renormalization of the elements $M_{kj}$ is consistent with balancing the brightness contrast of the displayed images. The primary values $Q_1$ may also be reduced by a factor of 1.11, however the scale of $Q_1$ relative to the Pj may be selectable.

The complete transformation $G_1$ may be written as:

$$P_1=(0.81G^{2.2}+0.19R^{2.2})^{1/\gamma},$$

$$P_2=(0.32B^{2.2}+0.19R^{2.2})^{1/\gamma}$$

where in this case $\gamma$ may be 2.2.

In general, a transformation $G_1$ may be selected to also represent the chromaticity of the first image in the primary colors $\{P_1,P_2\}$. For example, red hue may be selectively displayed as yellow hues, gray hue, or purple hues. In other words, the $M_{2R}$ and $M_{3R}$ and $M_{kj}$ in general may vary throughout an image as long as they satisfy the balanced brightness constraints at each point. This allows for complex projections of the red coordinate R into the primary colors $P_1$ and $P_2$. These complex projections are within the scope of the present invention.

For a particular display apparatus, the transformation $G_2$ may transform the coordinates $\{Y_L\}$ into the primary color $\{Q_1\}$ as follows:

$$Q_1=\alpha_Q Y_L$$

where $\alpha_Q$ may be chosen to select the relative brightness of the second image; and where $\gamma=2.2$ in the range of brightness values selected for the primary color $\{Q_1\}$.

This second example demonstrates a method to display stereoscopic images distributed in the $\{C_1,C_2,C_3,Y_L\}$ format as red/cyan anaglyphs with balanced brightness contrast. Similarly stereoscopic images distributed in the $\{C_1,C_2,C_3,Y_L\}$ format may be displayed as blue/yellow and green/magenta anaglyphs with balanced brightness by methods of the present invention.

Display of Color Stereoscopic Image Pairs

One embodiment of the present invention provides methods to transform the coordinates $\{C_1,C_2,C_3,Y_L\}$ into two color images. The coordinates $\{C_1,C_2,C_3\}$ may be transformed using a transformation $G_1$ into a first set of primary colors $\{P_1, \ldots, P_m\}$ of a display apparatus. The coordinates $\{C_1,C_2,C_3,Y_L\}$ may be transformed using a transformation $G_2$ into a second set of primary colors $\{Q_1, \ldots, Q_m\}$ of a display apparatus. Transformations $G_1$ and $G_2$ may be summarized as follows:

$$\{C_1, C_2, C_3\} \stackrel{G_1}{\rightarrow} \{P_1, \ldots, P_m\}$$

$$\{C_1, C_2, C_3\}\{Y_L\} \stackrel{G_2}{\rightarrow} \{Q_1, \ldots, Q_n\}.$$

The transformation $G_2$ may transform the brightness coordinate $Y_j = Y_L$ into each primary color $Q_j$. Or a transformation $G_D$ may transform the coordinates $\{C_1,C_2,C_3\}\{Y_L\}$ into color coordinates $\{D_1,D_2,D_3\}$ of the second image which may be of the same color space as the coordinates $\{C_1,C_2,C_3\}$ of the first image. Then the transformation $G_2$ may transform the coordinates $\{D_1,D_2,D_3\}$ into the primary colors $\{Q_1, \ldots, Q_n\}$ $$\{C_1, C_2, C_3\}\{Y_L\} \overset{G_D}{\rightarrow} \{D_1, D_2, D_3\} \overset{G_2}{\rightarrow} \{Q_1, \ldots, Q_n\}.$$

The transformation $G_2$ which transforms the brightness $Y_D$ of the second image represented in the coordinates $\{D_1, D_2, D_3\}$ into the values of the primary colors $\{Q_1, \ldots, Q_n\}$ may be obtained as follows:

First, the coordinates $\{D_1,D_2,D_3\}$ may be transformed into linear brightness coordinates $\{D^L_1, D^L_2, D^L_3\}$:

$$D^L_j = H_{Dj}(D_j)$$

using functions $H_{Dj}$. The functions $H^{-1}_{Dj}$ are the non-linearity functions encoded into the coordinates $\{D_1,D_2,D_3\}$ of the second image. Linear brightness coordinates may be defined as color coordinates whose contribution to the brightness of a color may be added together to obtain the total brightness of a color.

In some reference color spaces, the form of the functions $H_{Dj}$ may be known. For example in the sRGB color space, the functions $H_{Dj}$ may be approximated by:

$$H_{Dj}(D_j) = D^{\gamma j}$$

where the $\gamma_j$ may be about 2.2. Then the linear brightness $Y^L_D$ of the second image represented in coordinates $\{D_1,D_2,D_3\}$ may be obtained by adding the contribution of each coordinate to the brightness:

$$Y^L_D = \Sigma_j \delta_j D^L_j = \Sigma_j \delta_j H_{Dj}(D_j)$$

where $$1 = \Sigma_j \delta_j.$$

The parameters $\delta_j$ may be determined from observations. In a reference color space, the values of $\delta_j$ may be known. For example in the sRGB color space, $\delta_1$ may be about 0.2126, $\delta_2$ may be about 0.7152, and $\delta_3$ may be about 0.0722.

Second, a transformation N may be selected to transform the coordinates $D^L_j$ into the linear primary color values $Q^L_k$ given by $Q^L_k = H^{Qk}(Q_k)$ as follows $$Q^L_k = \Sigma_j N_{kj} D^L_j = \Sigma_j N_{kj} H_{Qk}(Q_k).$$

Preferably, the elements $N_{kj}$ may be selected to represent the chromaticity of the coordinates $\{D_1,D_2,D_3\}$ in the primary colors $\{Q_1, \ldots, Q_n\}$ however, this is not required in order to display a balanced brightness stereoscopic image. In general, the transformation N may be a linear transformation or a complex, non-linear function.

The linear brightness $Y^L_Q$ of the first image displayed in the primary colors $\{Q_1, \ldots, Q_n\}$ may be approximated by $$Y^L_Q = \Sigma_k \epsilon_k Q_L^k = \Sigma_k \epsilon_k H_{Qk}(Q_k)$$

where $$1 = \Sigma_k \epsilon_k.$$

The parameters $\epsilon_k$ may be determined from experimental observations of the relative brightness of the primary colors of the display apparatus viewed through a second viewing filter $F_2$.

In order to conserve the brightness in the first image, the elements $N_{kj}$ may satisfy the condition $$\delta_j = \lambda_2 \Sigma_k \epsilon_k N_{kj}$$

where $\lambda_2$ is a scaling factor. These conditions may be satisfied by selecting elements $N_{kj}$ which conserve the brightness of each initial color coordinate $D_j$.

Third, the linear primary colors $Q^L_k$ may be transformed into the non-linear values used by the display apparatus $$Q_k = H^{-1}_{Qk}(Q^L_k)$$

where the functions $H^{-1}_{Qk}$ may be determined for the primary colors of a display apparatus. A display apparatus may use a gamma function to approximate $H_{Qk}$ as follows:

$$Q_k = (Q^L_k)^{1/\gamma k}$$

where the $\gamma_k$ are properties of the display apparatus.

The transformation $G_2$ may be represented by the relationship $$Q_k = H^{-1}_{Qk}(\Sigma_j N_{kj} H_{Dj}(D_j))$$

or sometimes by the relationship $$Q_k = (\Sigma_j N_{kj} D_j^{\gamma j})^{1/\gamma k}.$$

where $\gamma_j$ and $\gamma_k$ are often near 2.2.

The first and second sets of primary colors may have different polarization states, different color spectra, or may be displayed on different regions of surfaces, or may be displayed time sequentially, or may be displayed autostereoscopically. In general, the primary color coordinates $\{Q_1, \ldots, Q_n\}$ of the second image may be generated from both the values of coordinates $\{Y_L\}$ of the second image and the values of coordinates $\{C_1,C_2,C_3\}$ of the first image using either methods of the prior art or methods described herein. Some methods may use additional coordinates such as a depth map or chromaticity values of the second image which may be included in the file format of the present invention.

One embodiment of the present invention provide a method of generating a color second image from the coordinates $\{C_1,C_2,C_3\}\{Y_L\}$ by combining the brightness of the second image with the chromaticity of the first image. The coordinates $\{C_1,C_2,C_3\}$ may be transformed using transformation $G_D$ into coordinates $\{x_1,y_1,Y_1\}$ of the CIE xyY color space. Then the second color image may be constructed from the coordinates $\{x_1,y_1,Y_L\}$ using transformation $G_D$. Then the coordinates $\{x_1,y_1,Y_L\}$ may be transformed into the primary colors $\{Q_1, \ldots, Q_n\}$ using transformation $G_2$. In this case, the hues of the second generated image may show parallax artifacts due to the parallax difference in the hues $\{x_1,y_1\}$ and brightness $\{Y_L\}$ in the generated second image. In general, a depth map may be used to reduce the parallax artifacts in the generated second image.

Use of a Depth Map

Some stereoscopic display apparatus require colored first and second images. These display apparatus may display two full color images from stereoscopic images in the format $\{C_1,C_2,C_3,Y_L\}$ by using methods of the present invention to generate the color of the second image from the color of the first image. A depth map may be used to facilitate generating the color of the second image from the color of the first image. In addition to generating the color of the second image, a depth map may be used to generate a plurality of stereoscopic views for use in auto-stereoscopic displays or in order to select or change the range of stereoscopic parallax in a displayed stereoscopic view.

A depth map $\{Z_2\}$ may be used to calculate or obtain the parallax between the first and second images. Herein, a depth map may have either the depth values of the subject or the parallax values of the subject since the depth and parallax may be related by simple geometry. The color of a point in the second image may be determined from the color of the points in the first image which are offset from the point in the second image by an amount of parallax using a transformation $G_D$.

It is often convenient for the depth map to be in registry with the second image (to be of the second image). Then the parallax value used for a point in the second image may be obtained from the corresponding point in the depth map. The depth map coordinates and image coordinates may be written as $\{C_1,C_2,C_3,Y_2,Z_2\}$.

A depth map may be generated from the coordinates $\{C_1, C_2, C_3, Y_L\}$ by using methods of the present invention or by using methods of the prior art. A depth map may be generated from the luminance or brightness coordinates of the first and second images, and from additional depth information which may be included in the file using a transformation $G_M$. First, it may be convenient to transform the coordinates $\{C_1, C_2, C_3\}$ of the first image into brightness and chromaticity coordinates $$\{C_1, C_2, C_3, Y_L\} \rightarrow \{x_1, y_1, Y_1, Y_2\}.$$

Then the transformation $G_M$ may be used to generate the depth map coordinates $$\{x_1, y_1, Y_1, Y_2\} \xrightarrow{G_M} \{x_1, y_1, Y_1, Y_2, Z_2\}.$$

Then the chromaticity of the second image may be obtained from the chromaticity of the first image using transformation $G_D$ $$\{x_1, y_1, Y_1, Y_2, Z_2\} \xrightarrow{G_D} \{x_1, y_1, Y_1, x_2, y_2 Y_2,\} \rightarrow \{C_1, C_2, C_3, D_1, D_2, D_3\}$$

where the coordinates $\{x_1,y_1,Y_1\}\{x_2,y_2,Y_2,\}$ may be transformed into coordinates $\{C_1,C_2,C_3\}$ and $\{D_1,D_2,D_3\}$ of the original color space.

In the transformation $G_M$, the variation of the luminance of the second image may be fit to the variation of the luminance of the first image using variable parallax values and a fitting method. A fitting algorithm may be used to find the parallax values which best match the variation of the first and second images over certain regions of the first and second images. The fitting method may be performed at more than one length scale in order to determine the reliability of the fit over a certain region. Generally, a fitting method may be used to generate a depth map over the parts of the subject in the second image which are also in the first image. Regions of the second image that are occluded in the first image may not generate meaningful depth map points.

A fitting method may generate errors in the depth map at certain points. Generally, the more complex the fitting method the fewer the errors in the depth map. However, a complex fitting method may be computationally demanding which may cause an undesirable delay the display of the images. The errors in a generated depth map may be resolved or filled in using depth coordinates $\{p\}$ which may be included in the file format of the present invention $\{C_1, C_2, C_3, Y_L\}\{p\}$. In particular, points $\{q\}$ that generate errors in a simple fitting method may be resolved (over ridden) with depth data $\{p\}$ which may be included in the file for those points. Both the depth values $\{p\}$ and the point locations $\{q\}$ may be included in the file format $\{C_1,C_2,C_3,Y_L\}\{p,q\}$ of the present invention. A fitting method may continue generating the depth map using the depth map data as a new starting point. In this way, by the inclusion of a small amount of depth or parallax information in the file format of the present invention, a complete and accurate depth map may be generated using a simple or fast fitting method in transformation $G_M$ $$\{x_1, y_1, Y_1, Y_2\}\{p, q\} \xrightarrow{G_M} \{x_1, y_1, Y_1, Y_2, Z_2\}$$

In transformation $G_M$, it may not be necessary for the depth map $\{Z_2\}$ or $\{p,q\}$ to contain accurate depth information. Instead, the depth map need only be usable to obtain the correct color of the second image. In this case, an error in the depth map may be defined as a point where the generated color of the second image may be inaccurate. The coordinates $\{p,q\}$ may be included in the format to resolve these errors. Additional errors in the depth map may be defined for convenience in order to reduce the time required to generate the depth map $\{Z_2\}$. For example, very large values of parallax or large changes in parallax obtained by a fitting algorithm may be defined as errors in the depth map. Then by excluding large changes in parallax in a fitting algorithm may allow the depth map $\{Z_2\}$ to be generated more simply or more quickly.

In general, a depth map may be included in the $\{C_1,C_2,C_3, Y_L\}$ file format of the present invention. The depth map may be of low resolution or may be sparsely filled. The depth map may contain data where a particular method for generating a depth map from the first and second images may be known to generate errors or may be inefficiently generated. The sparse set of data points may be sufficient to provide clues to a simple fitting method in order to eliminate errors in the generated depth map. The sparse depth map may comprise points at sharp changes in depth, at the borders of occluded data, and at other locations. These sparse depth map points may be compressed by methods of the prior art. The depth map data points may be stored in units of parallax between the left and right images.

For example, a simple fitting method may start with pairs of point locations $q_1$ and $q_2$ and parallax values $p_1$ and $p_2$ which may be provided in the file in two channels $\{q,p\}$. The method for obtaining the parallax values $p_i$ for the points $q_i$ between $q_1$ and $q_2$ may be linear interpolation as follows:

$$p_i = p_1(q_2-q_i)/(q_2-q_1) + p_2(q_i-q_1)/(q_2-q_1)$$

where the interpolation may be used for $q_i$ between $q_1$ and $q_2$. In another example, a curved parallax between points $q_1$ and $q_2$ may be obtained as follows:

$$p_i = \sigma_i + p_1(q_2-q_i)/(q_2-q_1) + p_2(q_i-q_1)/(q_2-q_1)$$

where $Y'_1$ is the difference from a linear interpolation. The values of $\sigma_i$ may be determined for each point from $Y_2(q_i) = Y'_1(q_i + p_i)$ where $Y'_1$ is the scaled luminance of the first image and $Y_2$ is the luminance of the second image and where the interpolation is valid for $q_i$ between $q_1$ and $q_2$. Here either $Y_1$ or $Y_2$ may be scaled to match the scale of the other by using the luminance values at the depth map data points as follows:

$$Y'_1 = Y_2(q_1+p_1) + (Y_1(q_1) - Q_1(q_1))(Y_2(q_2+p_2) - Y_2(q_1+p_1))/(Y_1(q_2) - Y_1(q_1))$$

Since the luminance values are defined on discrete points, an interpolation between points of the $Y_1$ values may be helpful as follows:

$$Y_2(q_i) = p''_i Y'_1(q_i + p'_i + 1) + (1 - p''_i) Y'_1(q_i + p'_i),$$

$$p_i = p'_i + p''_i$$

where $p'_i$ is the integer part of $p_i$ and $p''_i$ is the fractional part of $p_i$. The task of a fitting method to obtain a depth map may be to search for values of $p_i$ or $p'_i$ and $p''_i$ for which $Y_2 = Y'_1$.

This fitting method may generate errors if performed over large distances or over sharp changes in depth or over occluded regions. However, these errors may be anticipated when the file is constructed so that the depth data pairs $\{q_1, p_1, q_2, p_2\}$ may be sufficient to avoid errors. Sufficient depth data pairs may be included to cover all regions of the second image which are not occluded in the first image. If the density of depth data pairs required to avoid errors is above a certain level in a region of the second image, the region of the second image may be considered to be occluded in the first image. In the occluded regions, the depth data points may be omitted from the file. In this way, the density of depth information in the file may be controlled. If a depth map is provided on a regular grid of points in the image, the coordinates $\{q\}$ may be omitted.

For the regions of the second image which are not occluded in the first image, the color data of the second image may be determined with using transformation $G_F$ by the following method:

$$X_2(q_i) = p''_i X_1(q_i + p'_i + 1) + (1 - p''_i) X_1(q_i + p'_i)$$

where X is a color property provided for the first image in the format $\{C_1, C_2, C_3, Y_L\}$.

The coordinates $\{C_1, C_2, C_3, Y_L\}$ do not contain the color information for portions of the second image occluded in the first image. Furthermore the use of a depth map may not be sufficient to generate the color of the second image in regions that are occluded in the first image. However in the transformation $G_F$, the missing color of the second image may be filled in by extrapolation or partial extrapolation. In partial extrapolation, the missing color may be filled in by extrapolation where the color is gradually reduced to grayscale as the distance into the occluded area increases.

On the other hand, the color of the second image in the occluded regions may be included in separate channels. These extra channels may be lightly populated with color data since only a small fraction of the second image will usually be occluded in the first image. Furthermore the chromaticity information for the occluded regions may be provided at a resolution smaller than the resolution of the coordinates $\{Y_L\}$. The extra channels in the occluded regions may contain the chromaticity coordinates $\{x_2, y_2\}$ of the second image. Then the format of the present invention may be written as $\{C_1, C_2, C_3, Y_L\}\{x_2, y_2\}\{p, q\}$. The transformation $G_D$ may use the color coordinates $\{x_2, y_2\}$ for points in the second image which are not obtained accurately or efficiently using other methods. In general, it is expected that the chromaticity data provided for the occluded regions may be compressed to a higher degree than the combination of the luminance and the chromaticity of the occluded regions.

Compressing the Brightness Channels

Providing a sparse depth map in the four-channel format of the present invention has another advantage. The depth map may be used by a compression method to compress the $Y_1$ and $Y_L$ channels of the first and second images respectively. On one embodiment of the present invention, a difference coordinate may be generated $$dY = Y_2 - Y_1.$$

Then the coordinate dY may be compressed. In another embodiment of the present invention, a depth map may be used to make the difference coordinate generally smaller as follows:

$$dY' = Y_2(q_i) - Y_1(q_i + p_i)$$

where $p_i$ may be provided by the depth map at low resolution or at sparsely populated points. Usually, coordinates $\{dY'\}$ may be compressed to a higher degree than coordinates $\{dY\}$.

In another embodiment of the present invention, stereoscopic images may be represented using coordinates $\{C_1, C_2, C_3, dY\}$ where the coordinates $\{dY\}$ provide information from which coordinates $\{Y_L\}$ may be obtained using a transformation $G_H$. The coordinates $\{C_1, C_2, C_3, dY\}$ may be compressed in a file. Herein, some aspects of the present invention which are applicable to the coordinates $\{C_1, C_2, C_3, Y_L\}$ are also applicable to the coordinates $\{C_1, C_2, C_3, dY\}$. The transformation $G_H$ may be written as $Y_2 = Y_1 + dY$.

In another embodiment of the present invention, stereoscopic images may be represented using coordinates $\{C_1, C_2, C_3, dY'\}\{p, q\}$ where the coordinates $\{dY'\}$ and $\{p, q\}$ provide information from which coordinates $\{Y_L\}$ may be obtained using a transformation $G_H$. The coordinates $\{C_1, C_2, C_3, dY'\}\{p, q\}$ may be compressed in a file. Herein, some aspects of the present invention which are applicable to the coordinates $\{C_1, C_2, C_3, Y_L\}$ are also applicable to the coordinates $\{C_1, C_2, C_3, dY'\}\{p, q\}$. The transformation $G_H$ may be written as $Y_2(q_i) = Y_1(q_i + p_i) + dY'$ where $p_i$ may be a value of p obtained from the coordinates $\{p, q\}$.

In summary, the four-channel stereoscopic format of the present invention $\{x_1, y_1, Y_1, Y_L\}$ may comprise two additional channels $\{x_2, y_2\}$ which contain the chromaticity of the second image in the regions occluded in the first image, and extra channels $\{q, p\}$ which contain sparsely populated depth data pairs or an extra channel $\{p\}$ which contains a low resolution depth map. Then the complete format may be represented as $$\{C_1, C_2, C_3, Y_L\}\{x_2, y_2\}\{q, p\},$$

or $$\{C_1, C_2, C_3, Y_L\}\{x_2, y_2\}\{p\}.$$

The color coordinates may be representable as xyY coordinates. Then the formats of the present invention may represented as $$\{x_1, y_1, Y_1, Y_L\}\{x_2, y_2\}\{q, p\},$$

or $$\{x_1, y_1, Y_1, Y_L\}\{x_2, y_2\}\{p\}.$$

The coordinates $\{x_2, y_2\}\{p\}$ or $\{x_2, y_2\}\{q, p\}$ may be used to generate the full-color second image. Other methods of the prior art for generating the full-color second image may be included as a component of some embodiments of the present invention. The coordinates $\{Y_L\}$ may be represented as difference coordinates $\{dY\}$ or $\{dY'\}$. Then the formats of the present invention may represented as for example $$\{x_1, y_1, Y_1, dY\}\{x_2, y_2\}\{q, p\},$$

or $$\{x_1, y_1, Y_1, dY\}\{x_2, y_2\}\{p\}.$$

Herein the aspects of the present invention which apply to the formats containing coordinates $\{C_1, C_2, C_3, Y_L\}$ also apply to formats containing coordinates $\{C_1,C_2,C_3,dY\}$ or $\{C_1,C_2,C_3,dY'\}$ as will be obvious to one skilled in the art.

Some standard file formats such as JPEG, PNG, and MPEG use compression methods to reduce the size of the digital files containing images or video. One aspect of the present invention uses these or other compression methods to reduce the bandwidth or file size of the stereoscopic formats of the present invention. A stereoscopic image contained in a compressed file format of the present invention may require little additional bandwidth or storage space compared with non-stereoscopic content.

Stereoscopic Communication

There are several methods of distributing or communicating stereoscopic content which are embodiments of the present invention. These embodiments may comprise the follow components: (1) methods to capture stereoscopic content; (2) methods to transform the stereoscopic content into the coordinates $\{C_1,C_2,C_3,Y_L\}$; (3) methods to compress the coordinates $\{C_1,C_2,C_3,Y_L\}$; (4) methods to store stereoscopic content; (5) methods to transmit or broadcast the content in the coordinates $\{C_1,C_2,C_3,Y_L\}$; (6) methods to receive the coordinates $\{C_1,C_2,C_3,Y_L\}$; (7) methods to de-compress the coordinates $\{C_1,C_2,C_3,Y_L\}$; and (8) methods to display the stereoscopic images.

Stereoscopic images may be captured by a stereoscopic camera and stored or transmitted in the stereoscopic format $\{C_1,C_2,C_3,Y_L\}$ of the present invention.

Another embodiment of the present invention provides a method to capture stereoscopic content into the format $\{C_1,C_2,C_3,Y_L\}$. This embodiment may comprise a stereoscopic camera similar in design to any stereoscopic camera of the prior art. For example the camera apparatus may comprise a first objective lens optically cooperative with a first image sensor and a second objective lens optically cooperative with a second image sensor. The first and second lenses may be positioned apart by the distance d of the stereo base. A stereo base is the distance between the first and second objective lenses in a stereoscopic camera. The optical axes of the first and second lenses may be generally directed toward the common subject. The axes may be generally parallel or the axes may intersect at a small angle at a distance from the lenses in a direction toward the common subject. The angle between the axes may be adjustable. The distance between the first and second lenses may be adjustable. The first and second sensor images may be periodically sampled to capture a first and second image of stereoscopic pairs of images. The first sensor may capture a full color first image in for example three primary color coordinates $\{A_1,A_2,A_3\}_2$. The second sensor may capture a full color second image in for example three primary color coordinates $\{B_1,B_2,B_3\}$ or the second sensor may capture a grayscale second image in for example one primary coordinate $\{B_1\}$ which represents the brightness contrast in the second image. The camera apparatus may comprise a method to transform the full-color first images into the coordinates $\{C_1,C_2,C_3\}$ of a reference color space using a transformation $G_C$. The camera apparatus may comprise a method to transform the second images into brightness coordinates $\{Y_L\}$ using a transformation $G_Y$. The transformations $G_C$ and $G_Y$ may be selected to preserve the brightness contrast of the first and second images in the coordinates $\{C_1,C_2,C_3,Y_L\}$. The camera apparatus may comprise a DVD, hard disk, memory card or other storage device for storing the captured images. The camera apparatus may comprise a communication port to transfer the stereoscopic images to a display apparatus or to an external storage device. The camera apparatus may comprise a display apparatus for displaying the captured stereoscopic images.

A stereoscopic player of the present invention may be used to play stereoscopic content stored in the stereoscopic format $\{C_1,C_2,C_3,Y_L\}$ of the present invention.

Another embodiment of the present invention provides a method to display stereoscopic content comprising: a display apparatus; a DVD, hard drive or other storage apparatus for storing a stereoscopic content; and a player which may read the stereoscopic content from the storage device. The stereoscopic content may be stored in the format $\{C_1,C_2,C_3,Y_L\}$ of the present invention. If the stereoscopic images are compressed, a decompression function implemented in software or hardware may be used to decompress the stereoscopic images. The stereoscopic content in the format $\{C_1,C_2,C_3,Y_L\}$ may be displayed using the primary colors $\{P_1, \ldots P_m, Q_1, \ldots, Q_n\}$ of the display apparatus where the spectra of the primary colors $\{Q_1, \ldots, Q_n\}$ may substantially not overlap the spectra of the primary colors $\{P_1, \ldots, P_m\}$. The coordinates $\{C_1,C_2,C_3\}$ of the stereoscopic images may be transformed into the primary colors $\{P_1, \ldots, P_m\}$ using a transformation $G_1$ while the coordinates $\{Y_L\}$ may be transformed into the primary colors $\{Q_1, \ldots, Q_n\}$ using a transformation $G_2$. The transformations $G_1$ and $G_2$ may be selectable so that the brightness contrast of the first and second images may be balanced when viewed through viewing filters of the present invention used for viewing anaglyph images.

Stereoscopic content received by a stereoscopic converter apparatus in the format $\{C_1,C_2,C_3,Y_L\}$ may be converted to the primary color coordinates $\{T_1, \ldots, T_t\}$ of a display apparatus for either non-stereoscopic display or stereoscopic display. The stereoscopic converter apparatus may communicate with a display device through a communication port.

Another embodiment of the present invention provides methods to receive stereoscopic content in the format $\{C_1,C_2,C_3,Y_L\}$ and transform the coordinates into primary color coordinates $\{T_1, \ldots, T_t\}$ of a display apparatus and transmit the color coordinates to a display apparatus. The present embodiment may comprise a receiver for receiving the stereoscopic content in the format $\{C_1,C_2,C_3,Y_L\}$, transformations $G_1$ and $G_2$ for transforming the first and second images into primary color coordinates $\{P_1, \ldots, P_m, Q_1, \ldots, Q_n\}$ for stereoscopic display where the set of primary colors $\{T_1, \ldots T_t\}$ may be equal to the union of the set of primary colors $\{P_1, \ldots, P_m, Q_1, \ldots, Q_n\}$. The coordinates $\{C_1,C_2,C_3\}$ may be transformed into the primary colors $\{P_1, \ldots, P_m\}$ using the transformation $G_1$ while the coordinates $\{Y_L\}$ may be transformed into the primary colors $\{Q_1, \ldots, Q_n\}$ using transformation $G_2$. The transformations $G_1$ and $G_2$ may be selectable so that the brightness contrast of the first and second images may be balanced when viewed through viewing filters $F_1$ and $F_2$ of the present invention used for viewing anaglyph images. The present embodiment may further comprise a transformation $G_5$ for transforming the first image into the primary color coordinates $\{T_1, \ldots, T_t\}$ for non-stereoscopic display. The present embodiment may further comprise a transmitter that may transmit the color coordinates $\{T_1, \ldots, T_t\}$ or $\{P_1, \ldots, P_m, Q_1, \ldots, Q_n\}$ to a display apparatus. The present embodiment may further comprise a communication port for transmitting the color coordinates $\{T_1, \ldots, T_t\}$ or $\{P_1, \ldots, P_m, Q_1, \ldots, Q_n\}$ to a display apparatus. The methods of transmission of the transmitter may comprise electronic or electromagnetic signal transmission or other signal transmission method. The receiver may receive stereoscopic content by electronic or electromagnetic signal or other transmission method.

Stereoscopic communication between two users each with a stereoscopic communication device of the present invention may be performed using the stereoscopic format $\{C_1,C_2,C_3,Y_L\}$ of the present invention.

Another embodiment of the present invention provides methods for two-way communication of stereoscopic images comprising: a first communication apparatus which may be used by a first user; a stereoscopic camera apparatus capable of capturing stereoscopic content in the format $\{C_1,C_2,C_3,Y_L\}$; a method to compress images in the format $\{C_1,C_2,C_3,Y_L\}$ into a standard compressed format such an mpeg or jpeg format; a method to transmit the compressed stereoscopic video or images to a second communication device which may be used by a second user at a distance location. The methods of transmission may comprise internet transmission (wireless or wire connection), cell phone transmission, any TV broadcast transmission or satellite transmission, phone line, or TV cable transmission or any other method used for remote communication. The first communication apparatus may also comprise a method to receive stereoscopic images in the format $\{C_1,C_2,C_3,Y_L\}$ from a remote source. The images received from a remote source may be decompressed by the communication apparatus if necessary. The received video or still images may be displayed by the display apparatus using primary colors $\{P_1,\ldots,P_m,Q_1,\ldots,Q_n\}$. The stereoscopic content $\{C_1,C_2,C_3,Y_L\}$ may be displayed using the primary colors $\{P_1,\ldots,P_m,Q_1,\ldots,Q_n\}$ of a display apparatus where the spectra of the primary color $\{Q_1,\ldots,Q_n\}$ may substantially not overlap the spectra of the primary colors $\{P_1,\ldots,P_m\}$. The coordinates $\{C_1,C_2,C_3\}$ may be transformed into the primary colors $\{P_1,\ldots,P_m\}$ while the coordinates $\{Y_L\}$ may be transformed into the primary colors $\{Q_1,\ldots,Q_n\}$. The transformations $G_1$ and $G_2$ may be selectable so that the brightness contrast of the first and second images may be balanced when viewed through viewing filters of the present invention used for viewing anaglyph images. The display apparatus may be attachable to the communication device through a communication port.

As noted above, the present invention is applicable to digital files, primary colors, color transformations and special filters and is believed to be particularly useful for storing, distributing, displaying and viewing stereoscopic images in various formats without retinal rivalry. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The invention claimed is:

1. A method of representing stereoscopic images comprising:
   a first image represented as coordinates $A_1,\ldots,A_r$;
   a second image represented as coordinates $B_1,\ldots,B_s$;
   transforming coordinates $A_1,\ldots,A_r$ into color coordinates $C_1,C_2,C_3$ using transformation $G_C$;
   transforming coordinates $B_1,\ldots,B_s$ into coordinates $Y_L$ using transformation $G_Y$;
   brightness $Y_C$ of said first image is represented in coordinates $C_1,C_2,C_3$;
   brightness $Y_Y$ of said second image is represented in coordinates $Y_L$; and
   wherein the brightness contrast of said first and second images represented in coordinates $C_1,C_2,C_3,Y_L$ are balanced for like subject matter in said first and second images.

2. The method of claim 1 wherein
   linear brightness $Y^L_A$ represented in coordinates $A_1,\ldots,A_r$ is given by
   $$Y^L_A = \Sigma_j \mu_j H_{Aj}(A_j)$$
   where $\mu_j$ are constants;
   linear brightness $Y^L_C$ represented in coordinates $C_1,C_2,C_3$ is given by
   $$Y^L_C = \Sigma_k \nu_k H_{Ck}(C_k)$$
   where $\nu_k$ are constants;
   $G_C$ is represented by relationship $C_k = H^{-1}{}_{Ck}(\Sigma_j W_{kj} H_{Aj}(A_j))$; and
   $W_{kj}$ satisfies condition $\mu_j = \lambda_3 \Sigma_k \nu_k W_{kj}$ where $\lambda_3$ is a constant.

3. The method of claim 2 wherein $H_{Aj}(A_j) = A_j^{vj}$ and $H_{Ck}(C_k) = C_k^{\gamma k}$ where $\gamma_j$ and $\gamma_k$ are constants whereby $G_C$ is represented by the relationship
   $$C_k = (\Sigma_j W_{kj} A_j^{vj})^{1/\gamma k}.$$

4. The method of claim 1 wherein
   linear brightness $Y^L_B$ represented in coordinates $B_1,\ldots,B_s$ is given by
   $$Y^L_B = \Sigma_j \sigma_j H_{Bj}(B_j)$$
   where $\sigma_j$ are constants;
   linear brightness $Y^L_Y$ represented in coordinates $Y_L$ is given by
   $$Y^L_Y = H_Y(Y_L); \text{ and}$$
   $G_Y$ is represented by relationship $Y_L = H^{-1}{}_Y(\Sigma_j \sigma_j H_{Bj}(B_j))$.

5. The method of claim 4 wherein $H_{Bj}(B_j) = B_j^{vj}$ and $H_Y(Y_L) = Y_L^Y$ where $\gamma_j$ and $\gamma$ are constants whereby $G_Y$ is represented by the relationship
   $$Y_L = (\Sigma_j \sigma_j B_j^{vj})^{1/\gamma}.$$

6. The method of claim 1 wherein
   coordinates $C_1,C_2$ are chromaticity coordinates; and
   coordinates $\{C_3\}$ are brightness coordinates.

7. The method of claim 1 wherein coordinates $C_1,C_2,C_3$ are primary color coordinates.

8. A method of displaying stereoscopic images comprising:
   a first image represented by coordinates $C_1,C_2,C_3$;
   a second image represented by coordinates $Y_L$;
   primary colors $P_1,\ldots,P_m$ for displaying said first image;
   primary colors $Q_1$ for displaying said second image;
   transforming coordinates $C_1,C_2,C_3$ into primary colors $P_1,\ldots,P_m$ using transformation $G_1$;
   transforming coordinates $Y_L$ into primary color $Q_1$ using transformation $G_2$;
   brightness $Y_P$ of said first image represented in primary colors $P_1,\ldots,P_m$;
   brightness $Y_Q$ of said second image represented in primary color $Q_1$; and
   wherein the brightness contrast of said first and second images represented in primary colors $P_1,\ldots,P_m,Q_1$ are balanced for like subject matter in said first and second images.

9. The method of claim 8 wherein:
   linear brightness $Y^L_C$ represented in coordinates $C_1,C_2,C_3$ is given by
   $$Y^L_C = \Sigma_j \alpha_j H_{Cj}(C_j)$$
   where $\alpha_j$ are constants;
   linear brightness $Y^L_P$ represented in primary colors $P_1,\ldots,P_m$ is given by
   $$Y^L_P = \Sigma_k \beta_k H_{Pk}(P_k)$$

where $\Theta_k$ are constants;

$G_1$ is represented by relationship $P_k = H^{-1}{}_{Pk}(\Sigma_j M_{kj} H_{Cj}(C_j))$; and $M_{kj}$ satisfies condition $\alpha_j = \lambda_1 \Sigma_k \beta_k M_{kj}$ where $\lambda_1$ is a constant.

10. The method of claim 9 wherein $H_{Cj}(C_j) = C_j^{\gamma j}$ and $H_{Pk}(P_k) = P_k^{\gamma k}$ where $\gamma_j$ and $\gamma_k$ are constants whereby G1 is represented by relationship $$P_k = (\Sigma_j M_{kj} C_j^{\gamma j})^{1/\gamma k}.$$

11. The method of claim 8 wherein
linear brightness $Y^L{}_Y$ represented in coordinates $Y_L$ is given by $$Y_L^Y = H_Y(Y_L);$$

linear brightness $Y^L{}_{Q1}$ represented in primary color $Q_1$ is given by $$Q^L{}_1 = H_{Q1}(Q_1); \text{ and}$$

$G_2$ is represented by relationship $Q_k = \alpha_Q H^{-1}{}_{Q1}(H_Y(Y_L))$ where $\alpha_Q$ is a constant.

12. The method of claim 11 wherein $H_Y(Y_L) = Y_L^{\gamma Y}$ and $H_{Q1}(Q_1) = Q_1^{\gamma Q}$ where $\gamma_Y$ and $\gamma_Q$ are constants whereby $G_2$ is represented by the relationship $$Q_1 = \alpha_Q Y_L^\gamma$$

where $\gamma$ is a constant.

13. The method of claim 8 further comprising:
a first filter $F_1$ substantially transmitting primary colors $P_1, \ldots, P_m$ and blocking primary color $Q_1$; and
a second filter $F_2$ substantially transmitting primary colors $Q_1$ and blocking primary colors $P_1, \ldots, P_m$.

14. The method of claim 8 wherein the set of spectra of primary colors $P_1, P_2; P_3$ are not substantially overlapping the spectra of primary colors color $Q_1$.

15. A method of displaying stereoscopic images comprising:
a first image represented by coordinates $C_1, C_2, C_3$;
a second image represented by coordinates $Y_L$;
primary colors $P_1, \ldots, P_m$ for displaying said first image;
primary colors $Q_1, \ldots, Q_n$ for displaying said second image;
transforming coordinates $C_1, C_2, C_3$ into primary colors $P_1, \ldots, P_m$ using transformation $G_1$;
transforming coordinates $Y_L$ into primary colors $Q_1, \ldots, Q_n$ using transformation $G_2$;
brightness $Y_P$ of said first image represented in primary colors $P_1, \ldots, P_m$;
brightness $Y_Q$ of said second image represented in primary colors $Q_1, \ldots, Q_n$; and
wherein the brightness contrast of said first and second images represented in primary colors $P_1, \ldots, P_m$, $Q_1, \ldots, Q_n$ are balanced for like subject matter in said first and second images.

16. The method of claim 15 wherein:
linear brightness $Y^L{}_C$ represented in coordinates $C_1, C_2, C_3$ is given by $$Y^L{}_C = \Sigma_j \alpha_j H_{Cj}(C_j)$$

where $\alpha_j$ are constants;
linear brightness $Y^L{}_P$ represented in primary colors $P_1, \ldots, P_m$ is given by $$Y^L{}_P = \Sigma_k \beta_k H_{Pk}(P_k)$$

where $\beta_k$ are constants;

$G_1$ is represented by relationship $P_k = H^{-1}{}_{Pk}(\Sigma_j M_{kj} H_{Cj}(C_j))$; and $M_{kj}$ satisfies condition $\alpha_j = \lambda_1 \Sigma_k \beta_k M_{kj}$ where $\lambda_1$ is a constant.

17. The method of claim 16 wherein $H_{Cj}(C_j) = C_j^{\gamma j}$ and $H_{Pk}(P_k) = P_k^{\gamma k}$ where $\gamma_j$ and $\gamma_k$ are constants whereby $$P_k = (\Sigma_j M_{kj} C_j^{\gamma j})^{1/\gamma k}.$$

18. The method of claim 15 further comprising:
transforming coordinates $C_1, C_2, C_3, Y_L$ into coordinates $x_1, y_1, Y_L$ using transformation $G_D$ where $x_1$ and $y_1$ are chromaticity coordinates of said first image, and $Y_L$ represents the brightness of said second image; transforming coordinates $x_1, y_1, Y_L$ into primary colors $Q_1, \ldots, Q_n$ using transformation G2; and
wherein the brightness contrast of said second image is displayed in primary colors $Q_1, \ldots, Q_n$ and chromaticity coordinates $x_1, y_2$ are represented in primary colors $Q_1, \ldots, Q_n$.

19. The method of claim 15 further comprising sparse coordinates q or sparse coordinates p,q where coordinates p are depth or parallax coordinates associated with said second image and coordinates q are location coordinates associated width said second image.

20. The method of claim 19 further comprising:
transforming coordinates $C_1, C_2, C_2, Y_L$, and p,q into coordinates $x_1, y_1, Y_1, Y_2$ using transformation $G_D$ where $x_1$ and $y_1$ are chromaticity coordinates of said first image, $Y_1$ approximates brightness Yc of said first image represented in coordinates $C_1, C_2, C_3$, and $Y_2$ approximates brightness $Y_Y$ of said second image represented in coordinates $Y_L$;
transforming coordinates $x_1, y_1, Y_1, Y_2$ into coordinates $x_2, y_2, Y_2$ using a transformation $G_D$ where $x_2$ and $y_2$ are chromaticity coordinates of said second image;
transforming coordinates $x_2, y_2, Y_{B2}$ into primary colors $Q_1, \ldots, Q_n$ using transformation G2; and
where the brightness contrast of said second image $Y_Y$ is displayed in primary colors $Q_1, \ldots, Q_n$ and chromaticity coordinates $x_2, y_2$ are represented in primary colors $Q_1, \ldots, Q_n$.

21. The method of claim 19 further comprising transforming coordinates $C_1, C_2, C_3, Y_L$ p,q into coordinates $C_1, C_2, C_3, Y_L, D_2$ using transformation $G_M$ where coordinates $D_2$ are depth or parallax values for each coordinate $Y_L$ of said second image which is not occluded in said first image.

22. The method of claim 15 further comprising chromaticity coordinates $x_2, y_2$ for a set of points in said second image.

23. The method of claim 15 further comprising:
transforming coordinates $C_1, C_2, C_3, Y_L$ into coordinates $C_1, C_2, C_3, D_1, D_2, D_3$ using transformation $G_D$ where coordinates $D_1, D_2, D_3$ represent said second image in the color space of coordinates $C_1, C_2, C_3$;
linear brightness $Y^L{}_D$ represented in coordinates $D_1, D_2, D_3$ is given by $$Y^L{}_D = \Sigma_j \delta_j H_{Dj}(D_j)$$

where $\delta_j$ are constants;
linear brightness $Y^L{}_Q$ represented in primary colors $Q_1, \ldots, Q_n$ is given by $$Y^L{}_Q = \Sigma_k \epsilon_k H_{Qk}(Q_k)$$

where $\epsilon_k$ are constants;

$G_1$ is represented by relationship $Q_k = H^{-1}{}_{Qk}(\Sigma_j N_{kj} H_{Dj}(D_j))$; and $N_{kj}$ satisfies condition $\delta_j = \lambda_2 \Sigma_k \epsilon_k N_{kj}$ where $\lambda_2$ is a constant.

24. The method of claim 23 wherein $H_{Dj}(D_j) = D_j^{\gamma j}$ and $H_{Qk}(Q_k) = Q_k^{\gamma k}$ where $\gamma_j$ and $\gamma_k$ are constants whereby $G_1$ is represented by relationship $$Q_k = (\Sigma_j N_{kj} D^{\gamma j}_j)^{1/\gamma k}.$$

25. The method of claim 15 further comprising:
a first filter F1 substantially transmitting primary colors $P_1, \ldots, P_m$ and blocking primary color $Q_1, \ldots, Q_n$; and
a second filter F2 substantially transmitting Primary colors $Q_1, \ldots, Q_n$ and blocking primary colors $P_1, \ldots, P_m$.

26. A method of representing stereoscopic images comprising:
a first image represented as coordinates $A_1, \ldots, A_r$;
a second image represented as coordinates $B_1, \ldots, B_s$;
transforming coordinates $A_1, \ldots, A_r$ into color coordinates $C_1, C_2, C_3$ using transformation Gc;
transforming coordinates $B_1, \ldots, B_s$ into coordinates dY' using transformation $G_Y$;
brightness coordinates $Y_1$ of said first image represented in coordinates $C_1, C_2, C_3$;
coordinates dY' representing the difference in brightness coordinates $Y_2$ of said second image represented in coordinates $C_1, C_2, C_3$ at points q and brightness coordinates $Y'_1$ of said first image at points q+p offset from the points q in said second image by parallax coordinates p, dY'-$Y_2$-$Y'_1$; and
wherein the brightness contrast of said first and second images represented in coordinates $C_1, C_2, C_3$,dY' are balanced for like subject matter in said first and second images.

27. The method of claim 26 further comprising transforming coordinates $C_1 C_2, C_3$,dY' into coordinates $C_1, C_2, C_3, Y_2$ using transformation $G_H$.

28. The method of claim 26 further comprising sparse coordinates q or sparse coordinates p,q where coordinates p are depth or parallax coordinates associated with said second image and coordinates q are location coordinates associated with said second image.

29. The method of claim 26 wherein coordinates p are equal to zero or a constant.

30. A method of capturing stereoscopic images comprising:
a first objective lens;
a second objective lens,
said first lens spaced apart from said second lens by distance d;
at least one image sensor for capturing images;
capturing a first image into coordinates $C_1, C_2, C_3$;
capturing a second image into coordinates $Y_L$;
brightness Yc of said first image represented in coordinates $C_1, C_2, C_3$;
brightness $Y_Y$ of said second image represented in coordinates $Y_L$; and
wherein the brightness contrast of said first and second images represented in coordinates $C_1, C_2, C_3, Y_L$ are balanced for like subject matter in said first and second images.

31. The method of claim 30 further comprising storing coordinates $C_1, C_2, C_3, Y_L$ in a storage apparatus.

32. The method of claim 30 further comprising:
a display apparatus providing primary colors $P_1, P_2, P_3, Q_1$;
transforming coordinates $C_1, C_2, C_3$ into primary colors $P_1, \ldots, P_m$ using transformation G1;
transforming coordinates $Y_L$ into primary colors $Q_1$ using transformation G2; and
wherein the brightness contrast of said first and second images displayed in primary colors $P_1, \ldots, P_m, Q_1$ are balanced for like subject matter in said first and second images.

33. The method of claim 30 further comprising:
a communication port; and
transferring coordinates $C_1, C_2, C_3, Y_L$ to the display apparatus through said communication port.

34. A method of storing stereoscopic images comprising:
a storage apparatus for storing stereoscopic images;
a first image represented in coordinates $C_1, C_2, C_3$;
a second image represented in coordinates $Y_L$;
brightness Yc of said first image represented in coordinates $C_1, C_2, C_3$;
brightness $Y_Y$ of said first image represented in coordinates $Y_L$; and
wherein the brightness contrast of said first and second images represented in coordinates $C_1, C_2, C_3, Y_L$ are balanced for like subject matter in said first and second images.

35. The method of claim 34 further comprising:
a display apparatus providing primary colors $P_1, P_2, P_3$ and primary colors $Q_1$;
transforming coordinates $C_1, C_2, C_3$ into primary colors $P_1, P_2, P_3$; and
transforming coordinates $Y_L, C_2, C_3$ into primary color $Q_1$.

36. The method of claim 35 wherein the set of spectra of primary colors $P_1, P_2, P_3$ are not substantially overlapping the set of spectra of primary colors $Q_1$.

37. The method of claim 35 further comprising:
a first filter F1 substantially transmitting primary colors $P_1, \ldots, P_m$ and blocking primary color $Q_1, \ldots, Q_n$; and
a second filter F2 substantially transmitting primary colors $Q_1, \ldots, Q_n$ and blocking primary colors $P_1, \ldots, P_m$.

38. A method of converting stereoscopic images comprising:
a receiver apparatus;
receiving said stereoscopic images in format $C_1, C_2, C_3, Y_L$ using said receiver apparatus;
transforming coordinates $C_1, C_2, C_3$ into primary color coordinates $P_1, \ldots, P_m$ using transformation G1; and
transforming coordinates $C_1, C_2, C_3, Y_L$ into primary color coordinates $Q_1, \ldots, Q_n$ using transformation G2.

39. The method of claim 38 further comprising:
a transmitter apparatus; and
transmitting color coordinates $P_1, \ldots, P_m, Q_1, \ldots, Q_n$ using said transmitter apparatus.

40. The method of claim 38 further comprising:
a display apparatus providing primary colors $P_1, \ldots, P_m$, $Q_1, \ldots, Q_n$; and
displaying color coordinates $P_1, \ldots, P_m, Q_1, \ldots, Q_n$ using said display apparatus.

41. The method of claim 38 wherein:
brightness $Y_P$ of said first image is represented in the coordinates $P_1, \ldots, P_m$;
brightness $Y_Q$ of said second image is represented in the coordinates $Q_1, \ldots, Q_n$; and
wherein the brightness contrast of said first and second images represented in coordinates $P_1, \ldots, P_m, Q_1, \ldots, Q_n$ are balanced for like subject matter in said first and second images.

42. The method of claim 38 wherein n=1.

43. The method of claim 42 wherein m=2.

44. The method of claim 38 wherein n=0 whereby stereoscopic images are converted to non-stereoscopic images represented in coordinates $P_1, \ldots, P_m$.

45. The method of claim 38 further comprising:
a transmitter apparatus;
transforming coordinates $C_1, C_2, C_3$ into primary color coordinates $T_1, \ldots, T_t$ using transformation Gs; and
transmitting color coordinates $T_1, \ldots, T_1, \ldots, T_t$ using said transmitter apparatus.

46. The method of claim 45 wherein t=m+n.

47. A method of two-way communication of stereoscopic images comprising:
- a stereoscopic camera apparatus;
- capturing stereoscopic image pairs into coordinates $C_1, C_2, C_3, Y_L$;
- said first images of stereoscopic image pairs captured in coordinates $C_1, C_2, C_3$;
- the brightness Yc of said first images represented in coordinates $C_1, C_2, C_3$;
- said second images of stereoscopic image pairs captured in coordinates $Y_L$;
- brightness $Y_Y$ of said second images represented in coordinates $Y_L$;
- transmitting the coordinates $C_1, C_2, C_3, Y_L$ of the captured image pairs using a transmitter apparatus;
- receiving stereoscopic image pairs in coordinates $C_1, C_2, C_3, Y_L$ using a receiver apparatus;
- a display apparatus providing primary colors $P_1, \ldots, P_m, Q_1, \ldots, Q_n$;
- transforming coordinates $C_1, C_2, C_3$ of the received image pairs into primary color coordinates $P_1, \ldots, P_m$ using transformation G1; and
- transforming coordinates $C_1, C_2, C_3, Y_L$ of the received images into primary color coordinates $Q_1, \ldots, Q_n$ using transformation G2.

48. The method of claim 47 wherein n=1.

49. The method of claim 48 wherein n=2.

50. The method of claim 47 wherein:
- brightness $Y_P$ of the first image is represented in coordinates $P_1, \ldots, P_m$;
- brightness $Y_Q$ of the second image is represented in coordinates $Q_1, \ldots, Q_n$; and
- wherein the brightness contrast of said first and second images represented in coordinates $P_1, \ldots, P_m, Q_1, \ldots, Q_n$ are balanced for like subject matter in said first and second images.

51. A method of transmitting stereoscopic images comprising:
- a transmitter apparatus;
- first images of stereoscopic image pairs represented in coordinates $C_1, C_2, C_3$;
- the brightness Yc of said first images represented in coordinates $C_1, C_2, C_3$;
- second images of stereoscopic image pairs represented in coordinates $Y_L$;
- the brightness $Y_Y$ of said second images represented in coordinates $Y_L$; and
- transmitting coordinates $C_1, C_2, C_3, Y_L$ of said image pairs using the transmitter apparatus.

* * * * *